United States Patent
Inomata et al.

(10) Patent No.: US 12,401,896 B2
(45) Date of Patent: Aug. 26, 2025

(54) IMAGING DEVICE AND FOCUS POSITION SETTING METHOD

(71) Applicant: SONY GROUP CORPORATION, Tokyo (JP)

(72) Inventors: Seiichi Inomata, Tokyo (JP); Na Xu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 229 days.

(21) Appl. No.: 18/005,637

(22) PCT Filed: Jul. 2, 2021

(86) PCT No.: PCT/JP2021/025190
§ 371 (c)(1),
(2) Date: Jan. 16, 2023

(87) PCT Pub. No.: WO2022/024671
PCT Pub. Date: Feb. 3, 2022

(65) Prior Publication Data
US 2023/0276126 A1  Aug. 31, 2023

(30) Foreign Application Priority Data
Jul. 27, 2020 (JP) .................. 2020-126618

(51) Int. Cl.
*H04N 23/67* (2023.01)
*G02B 7/28* (2021.01)
(Continued)

(52) U.S. Cl.
CPC ............. *H04N 23/675* (2023.01); *G02B 7/28* (2013.01); *G03B 13/36* (2013.01); *G06T 5/50* (2013.01);
(Continued)

(58) Field of Classification Search
CPC ................................... H04N 23/675
See application file for complete search history.

(56) References Cited

U.S. PATENT DOCUMENTS

2014/0368719 A1* 12/2014 Kaneko ............... H04N 23/672
348/333.02
2024/0196088 A1* 6/2024 Kawanishi ........... H04N 23/675

FOREIGN PATENT DOCUMENTS

JP   2009-044682 A   2/2009
JP   2009-103912 A   5/2009
(Continued)

OTHER PUBLICATIONS

JP2016206306A; Nishitani et al; Control Device, Control Method and Control Program; English Translation (Year : 2016).*
(Continued)

*Primary Examiner* — Cynthia Segura
(74) *Attorney, Agent, or Firm* — CHIP LAW GROUP

(57) ABSTRACT

An imaging device according to the present technology includes a user operation detection unit that detects an operation of a user for focus control, a focus position movement detection unit that detects movement of a focus position based on the operation of the user detected by the user operation detection unit, a depth information detection unit that detects depth information in a focus control target area, and a focus control unit that sets a target focus position on the basis of the movement of the focus position and the depth information. Thus, a technology for executing focus control more in accordance with a user's intention is proposed.

18 Claims, 30 Drawing Sheets

(51) Int. Cl.
    *G03B 13/36*     (2021.01)
    *G06T 5/50*      (2006.01)
    *G06T 7/50*      (2017.01)
    *G06T 7/70*      (2017.01)

(52) U.S. Cl.
    CPC ............... *G06T 7/50* (2017.01); *G06T 7/70* (2017.01); *G06T 2207/20221* (2013.01)

(56) References Cited

FOREIGN PATENT DOCUMENTS

| | | | | |
|---|---|---|---|---|
| JP | 2014-021328 A | 2/2014 | | |
| JP | 2015-001717 A | 1/2015 | | |
| JP | 2016206306 A | * 12/2016 | ............. | H04N 23/67 |
| JP | 2018-125536 A | 8/2018 | | |

OTHER PUBLICATIONS

International Search Report and Written Opinion of PCT Application No. PCT/JP2021/025190, issued on Sep. 28, 2021, 12 pages of ISRWO.

\* cited by examiner

IMAGING DEVICE AND FOCUS POSITION SETTING METHOD

CROSS REFERENCE TO RELATED APPLICATIONS

This application is a U.S. National Phase of International Patent Application No. PCT/JP2021/025190 filed on Jul. 2, 2021, which claims priority benefit of Japanese Patent Application No. JP 2020-126618 filed in the Japan Patent Office on Jul. 27, 2020. Each of the above-referenced applications is hereby incorporated herein by reference in its entirety.

TECHNICAL FIELD

The present technology relates to an imaging device, a focus position setting method, and a program relating to automatic focus control and manual focus control.

BACKGROUND ART

Some imaging devices are provided with automatic focus control (autofocus control) and manual focus control. In such an imaging device, it is required to perform appropriate focus control on a subject intended by a user by linking autofocus control with manual focus control.

For example, Patent Document 1 proposes a method of determining a main subject with high accuracy in order to keep focusing on a subject intended by a user.

CITATION LIST

Patent Document

Patent Document 1: Japanese Patent Application Laid-Open No. 2018-125536

SUMMARY OF THE INVENTION

Problems to be Solved by the Invention

However, in the method described in Patent Document 1, the main subject is automatically determined, and thus the focus control intended by the user is not always performed.

Accordingly, the present disclosure proposes a technology for executing focus control more in accordance with a user's intention.

Solutions to Problems

An imaging device according to the present technology includes a user operation detection unit that detects an operation of a user for focus control, a focus position movement detection unit that detects movement of a focus position based on the operation of the user detected by the user operation detection unit, a depth information detection unit that detects depth information in a focus control target area, and a focus control unit that sets a target focus position on the basis of the movement of the focus position and the depth information.

That is, a change in the focus position based on a user operation is detected, and setting of the target focus position reflecting the user operation and focus control are performed after the user operation is finished.

The "focus position" in the present disclosure is a position in an optical axis direction that is in focus from the imaging device, and is a position of a subject with respect to the imaging device in a case where there is a subject in focus.

The "target focus position" is a target position at which the focus position is changed, and in many cases, the "target focus position" refers to a position in the depth direction of the subject as a target of the focus control.

Note that the depth direction refers to a depth direction from the imaging device to the subject side.

The focus position movement detection unit in the imaging device described above may detect a moving direction of the focus position.

The user's intention can be more accurately estimated by detecting the moving direction of the focus position.

The focus position movement detection unit in the imaging device described above may detect the moving direction every predetermined time.

By detecting the moving direction every predetermined time, the operation direction of the user is appropriately detected.

The depth information detection unit in the imaging device described above may detect depth information of an entirety of the focus control target area, and the focus control unit may set the target focus position on the basis of the depth information of the entirety of the focus control target area, the moving direction of the focus position, and an end time focus position at a time of detecting that an operation of the user with respect to the movement of the focus position has ended.

By setting the target focus position on the basis of the end time focus position, the user's intention is reflected in the focus control.

The imaging device described above may further include an in-screen target position setting unit that sets an in-screen target position on the basis of the depth information, in which the focus control unit may set a focus position corresponding to the in-screen target position as the target focus position.

The in-screen target position is an area set on the captured image, and is an area including a group of pixels having similar depth information. For example, depth information for each pixel is similar in a pixel area in which a certain subject is captured, and thus the pixel area is set as the in-screen target position.

In a case where the in-screen target position setting unit sets a plurality of the in-screen target positions, the focus control unit in the imaging device described above may set, as the target focus position, a focus position closest to the end time focus position among focus positions corresponding to the in-screen target positions.

Thus, in a case where the user moves the focus position to the vicinity of the target subject, the focus control for the target subject is performed.

In the imaging device described above may further include a subject recognition unit that recognizes a subject, in which in a case of determining that the in-screen target position matches an in-screen subject position that is a position of the subject in a screen recognized by the subject recognition unit, the focus control unit may set a focus position corresponding to the in-screen subject position as the target focus position.

Thus, for example, a subject as a focus control target is selected using image recognition processing or the like.

In a case where the subject recognition unit has recognized a plurality of the subjects, the focus control unit in the imaging device described above may set, as the target focus position, a focus position closest to the end time focus position among focus positions corresponding to the in-screen subject position.

Thus, an appropriate subject can be selected as the focus control target, and a subject for which the user's intention has been determined can be selected as the focus control target.

The focus control unit in the imaging device described above may perform tracking focus control for the subject focused according to the target focus position set after an end of the movement of the focus position.

Thus, the user does not need to perform an operation of continuing focusing on the subject that has been manually focused.

The imaging device described above may further include an area setting unit that sets the focus control target area according to an operation of a user.

Thus, it is possible to select the focus control target from among subjects by further reflecting the user's intention.

The imaging device described above may further include a display control unit that performs processing of superimposing and displaying a first frame image on a subject focused by the focus control unit among the subjects recognized by the subject recognition unit, and processing of superimposing and displaying a second frame image on other subjects.

Thus, the user can confirm the focus control target by confirming the display unit.

The focus control unit in the imaging device described above may perform focus control according to a set focus moving speed.

The speed (time) until focusing in the focus control can be specified only by changing the operation mode.

The user operation detection unit in the imaging device described above may detect an operation of a user on a focus ring, and the focus position movement detection unit may detect the moving direction of the focus position on the basis of an operation direction of the focus ring.

In addition, the user operation detection unit in the imaging device described above may detect a focus operation of the user by receiving operation information transmitted from an external operation device, and the focus position movement detection unit may detect the moving direction of the focus position on the basis of an operation direction of the focus operation.

Thus, the moving direction of the focus position is appropriately detected.

The focus control unit in the imaging device described above may be capable of switching between a first mode in which autofocus control on a subject is performed and a second mode in which manual focus control is performed, and may switch to the second mode in a case where the user operation detection unit detects an operation on the focus ring in the first mode.

Thus, the user only needs to operate the focus ring when switching to the second mode.

The user operation detection unit in the imaging device described above may determine that an end of the movement of the focus position is detected in a case where a state in which an operation on the focus ring is detected as the operation of the user is changed to a state in which the operation is not detected.

Thus, for example, it is possible to detect the end of the user operation on the focus ring using a sensor or the like.

The focus control unit in the imaging device described above may be capable of executing a first control of setting a focus position closest to the end time focus position among focus positions corresponding to the in-screen target position as the target focus position, and a second control of setting the target focus position according to the focus position and the moving direction at an end time point of the movement, and may switch from the first control to the second control in a case where a deviation between the closest focus position and the end time focus position is equal to or more than a predetermined threshold.

Thus, appropriate selection is made according to the operation mode of the user and the position of the subject.

A focus position setting method according to the present technology includes detecting an operation of a user for focus control, detecting movement of a focus position based on the operation of the user detected, detecting depth information in a focus control target area, and setting a target focus position on the basis of the movement of the focus position and the depth information.

A program according to the present technology is a program for causing an imaging device to execute processing of detecting an operation of a user for focus control, processing of detecting movement of a focus position based on the operation of the user detected, processing of detecting depth information in a focus control target area, and processing of setting a target focus position on the basis of the movement of the focus position and the depth information.

MODE FOR CARRYING OUT THE INVENTION

Hereinafter, embodiments will be described in the following order with reference to the accompanying drawings.
<1. Configuration of imaging device>
<2. Functional configuration of imaging device>
<3. Selection example of focus control target>
  <3-1. First selection example>
  <3-2. Second selection example>
  <3-3. Third selection example>
  <3-4. Other selection examples>
<4. Example of display mode on display unit>
<5. Processing example>
  <5-1. Overall flow>
  <5-2. First example of processing of selecting focus control target>
  <5-3. Second example of processing of selecting focus control target>
  <5-4. Third example of processing of selecting focus control target>
  <5-5. Fourth example of processing of selecting focus control target>
<6. Focus moving speed control>
<7. Application example>
<8. Summary>
<9. Present technology>

1. CONFIGURATION OF IMAGING DEVICE

Figure 1:
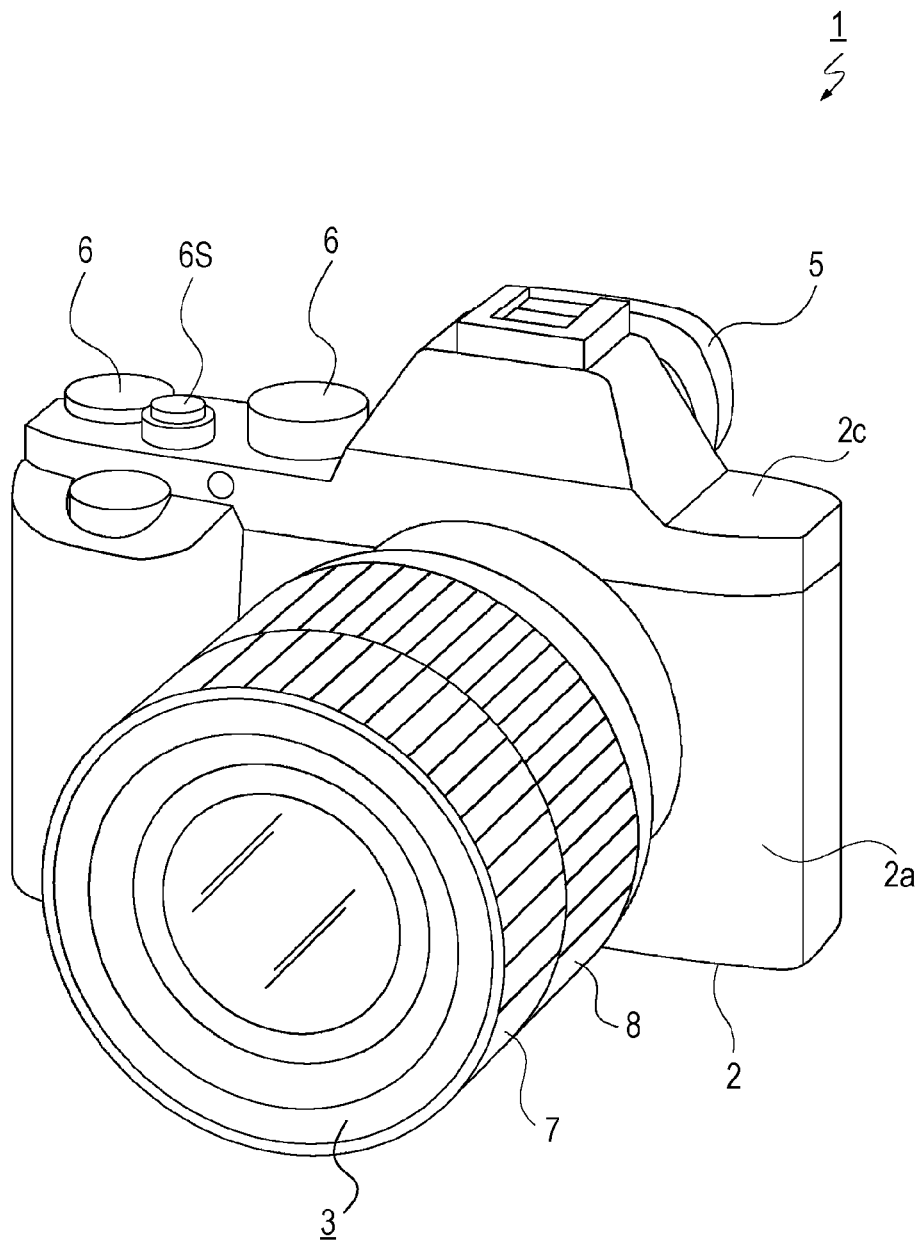
FIG. 1 is a perspective view of an imaging device of an embodiment of the present technology.
Figure 2:
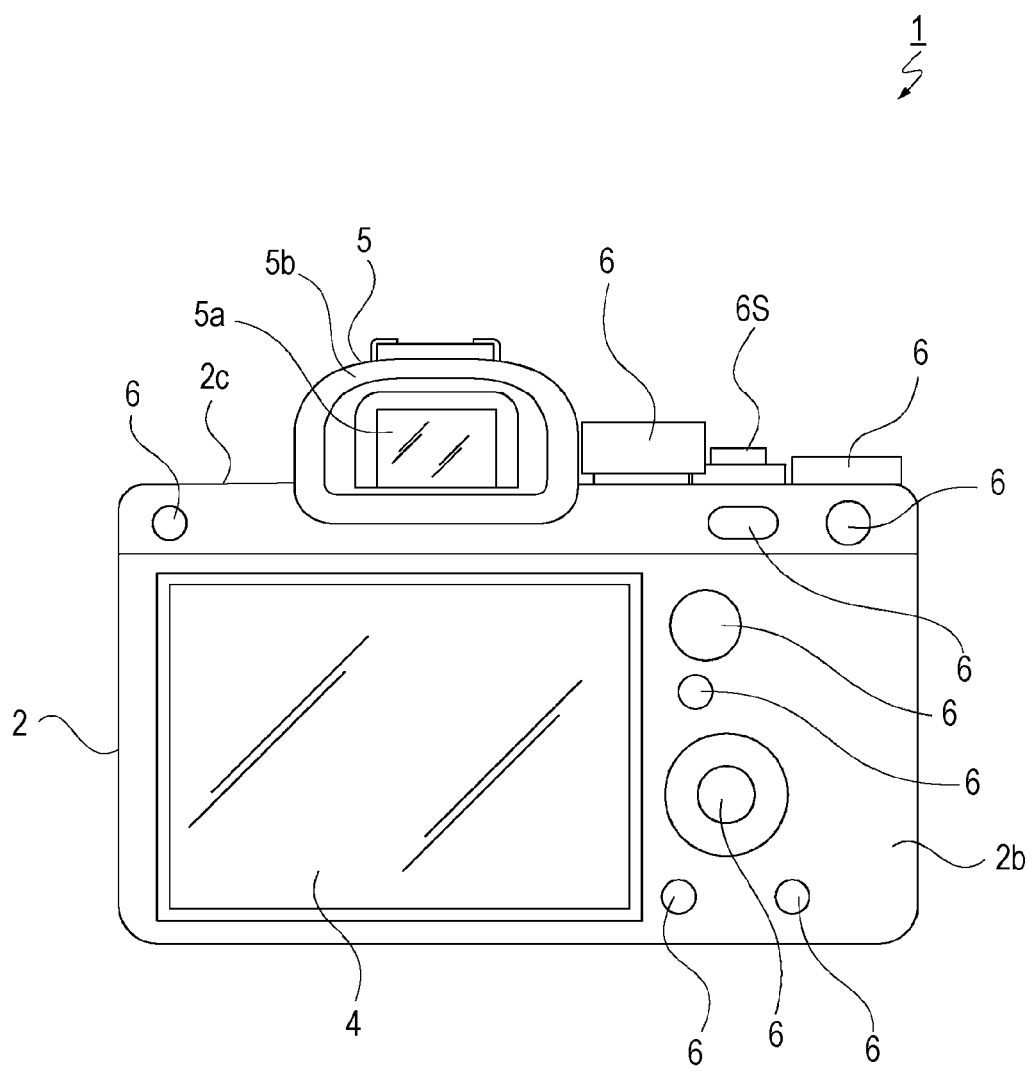
FIG. 2 is a rear view of the imaging device.

An external appearance of an imaging device 1 according to the present embodiment is illustrated in FIGS. 1 and 2.

Note that, in the following examples, closeness and distances of a subject and a target of focus control may be described, where "close" indicates being closer to the imaging device 1, and "far" indicates being farther from the imaging device 1. That is, the "close subject" indicates a subject closer to the imaging device 1.

Furthermore, the imaging device 1 is an example including an interchangeable lens but is not limited thereto, and can be widely applied to various imaging devices incorporated in, for example, a still camera, a video camera, and other devices.

The imaging device 1 includes a camera housing 2 in which necessary units are disposed inside and outside, and a lens barrel 3 attached to a front surface portion 2a of the camera housing 2.

A rear monitor 4 is arranged on a rear surface portion 2b of the camera housing 2. A through image, a recorded image, and the like are displayed on the rear monitor 4.

The rear monitor 4 is, for example, a display device such as a liquid crystal display (LCD) or an organic electroluminescence (EL) display.

An electric view finder (EVF) 5 is disposed on an upper surface portion 2c of the camera housing 2. The EVF 5 includes an EVF monitor 5a and a frame-shaped enclosing part 5b projecting backward so as to surround upper and left and right sides of the EVF monitor 5a.

The EVF monitor 5a is formed using an LCD, an organic EL display, or the like. Note that an optical view finder (OVF) may be provided instead of the EVF monitor 5a.

Various operation elements 6 are provided on the rear surface portion 2b and the upper surface portion 2c. Examples of operation elements 6 include a reproduction menu activation button, an enter button, a cross key, a cancel button, a zoom key, a slide key, a shutter button 6S (release button), and the like.

The various operation elements 6 include elements in various modes such as a button, a dial, and a pressable and rotatable composite operation element. With the operation element 6 of various modes, for example, a menu operation, a reproduction operation, a mode selection-switching operation, a focus operation, a zoom operation, and selection and setting of parameters such as a shutter speed and an F-number can be performed.

Various lenses are disposed inside the lens barrel 3, and a ring-shaped focus ring 7 and a ring-shaped zoom ring 8 are included.

The focus ring 7 is rotatable in a circumferential direction, and a focus position can be moved in an optical axis direction by various lenses moving in the optical axis direction according to a rotation direction.

The "focus position" is a position in focus from the imaging device 1 in the optical axis direction. This is, for example, the position of the subject with respect to the imaging device 1 in a case where there is a subject in focus. The focus position is changed by focus control.

By rotating the focus ring 7, the focus position on the imaging device 1 can be made closer or farther. Furthermore, by rotating the focus ring 7, manual focus control for manually adjusting an in-focus state can be achieved.

The zoom ring 8 is rotatable in the circumferential direction, and manual zooming control can be performed by the various lenses moving in the optical axis direction according to the rotation direction.

Figure 3:
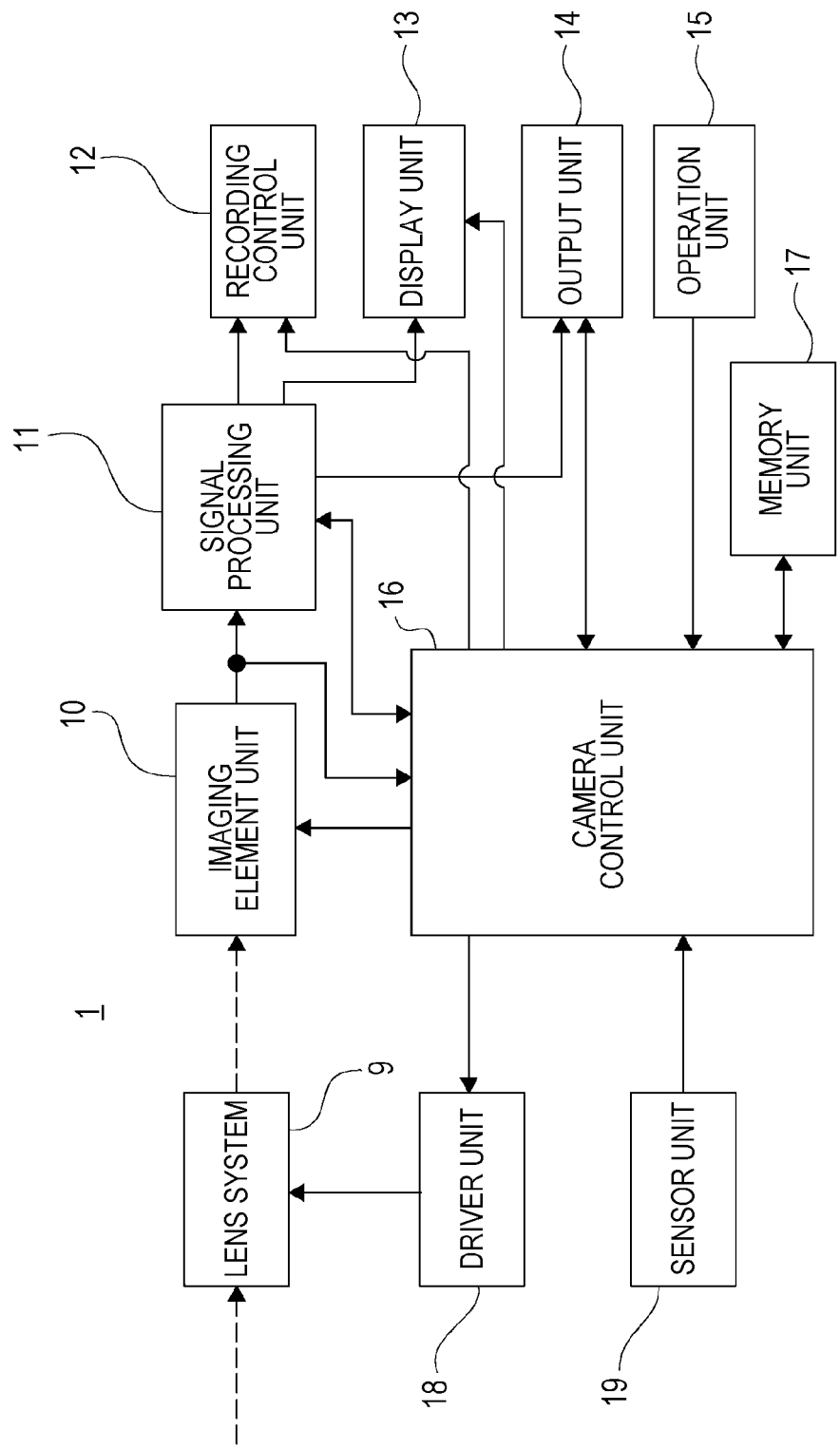
FIG. 3 is a block diagram of the imaging device.

FIG. 3 is a block diagram of the imaging device 1.

Inside and outside the camera housing 2 and the lens barrel 3 of the imaging device 1, a lens system 9, an imaging element unit 10, a signal processing unit 11, a recording control unit 12, a display unit 13, an output unit 14, an operation unit 15, a camera control unit 16, a memory unit 17, a driver unit 18, a sensor unit 19, and the like are provided. Furthermore, a power supply unit and the like are appropriately provided.

The lens system 9 includes various lenses such as an incident end lens, a zoom lens, a focus lens, and a condenser lens, a diaphragm mechanism that performs exposure control by adjusting, for example, an aperture amount of a lens or an iris (diaphragm) such that sensing is performed in a state where signal charges are not saturated and are within a dynamic range, and a shutter unit such as a focal plane shutter.

Note that a part of optical system components such as the lens system 9 may be provided in the camera housing 2.

The imaging element unit 10 is of a charge coupled device (CCD) type or a complementary metal-oxide semiconductor (CMOS) type, for example, and includes a sensing element in which a plurality of pixels is two-dimensionally arranged, and thereby performs exposure control of light from a subject incident through the lens system 9.

The imaging element unit 10 includes a processing unit that performs, for example, correlated double sampling (CDS) processing, automatic gain control (AGC) processing, or analog/digital (A/D) conversion processing on an electric signal photoelectrically converted by a pixel. Therefore, the imaging element unit 10 outputs a captured image signal as digital data to the signal processing unit 11 and the camera control unit 16.

The signal processing unit 11 includes, for example, a microprocessor specialized in digital signal processing such as a digital signal processor (DSP), a microcomputer, or the like.

The signal processing unit 11 includes units for performing various types of signal processing on the digital signal (captured image signal) transmitted from the imaging element unit 10.

Specifically, processing such as correction processing between R, G, and B color channels, white balance correction, aberration correction, and shading correction is performed.

Furthermore, the signal processing unit 11 performs YC generation processing of generating (separating) a luminance (Y) signal and a color (C) signal from R, G, and B image data, processing of adjusting luminance and color, and processing such as knee correction and gamma correction.

Moreover, the signal processing unit 11 performs conversion into a final output format by performing resolution conversion processing, codec processing for performing encoding for recording or communication, and the like. Image data converted into the final output format is stored in the memory unit 17. Furthermore, by outputting the image data to the display unit 13, an image is displayed on the rear monitor 4 or the EVF monitor 5a. Moreover, by being output from the external output terminal, it is displayed on a device such as a monitor provided outside the imaging device 1.

The recording control unit 12 includes, for example, a nonvolatile memory, and functions as a storage unit that stores image files (content file) of still image data, moving image data, and the like, attribute information of the image files, thumbnail images, and the like.

The image files are stored in a format such as joint photographic experts group (JPEG), tagged image file format (TIFF), or graphics interchange format (GIF), for example.

Various actual forms of the recording control unit 12 can be considered. For example, the recording control unit 12 may be configured as a flash memory built in the imaging device 1, or may be configured by a memory card (for example, a portable flash memory) that can be attached to and detached from the imaging device 1 and an access unit that accesses the memory card for storage and reading. Furthermore, it may be implemented as a hard disk drive (HDD) or the like as a form built in the imaging device 1.

The display unit 13 executes processing for performing various displays for an imaging person. The display unit 13 is, for example, the rear monitor 4 or the EVF monitor 5a. The display unit 13 performs processing of displaying the image data input from the signal processing unit 11 and converted into an appropriate resolution. Thus, what is called a through image, which is a captured image during standby for release, is displayed.

Moreover, the display unit 13 achieves display of various operation menus, icons, messages, and the like as a graphical user interface (GUI) on the screen on the basis of an instruction from the camera control unit 16.

Furthermore, the display unit 13 can display a reproduced image of the image data read from a recording medium in the recording control unit 12.

Note that, in the present example, while both the EVF monitor 5a and the rear monitor 4 are provided, the embodiment of the present technology is not limited to such a configuration, and only one of the EVF monitor 5a and the rear monitor 4 may be provided, or either one or both of the EVF monitor 5a and the rear monitor 4 may be detachable.

The output unit 14 performs data communication and network communication with an external device in a wired or wireless manner. For example, captured image data (a still image file or a moving image file) is transmitted to an external display device, recording device, reproduction device, or the like.

In addition, the output unit 14 may function as a network communication unit. For example, communication may be performed by various networks such as the Internet, a home network, and a local area network (LAN), and various data may be transmitted and received to and from a server, a terminal, or the like on the network.

The operation unit 15 includes not only the above-described various operation elements 6 but also the rear monitor 4 employing a touch panel system and the like, and outputs operation information corresponding to various operations such as a tap operation and a swipe operation of the imaging person to the camera control unit 16.

Note that the operation unit 15 may function as a reception unit of an external operation device such as a remote controller separate from the imaging device 1. Examples of the external operation device include a smartphone, a tablet, a Bluetooth (registered trademark) remote controller, a wired remote controller, a wireless operation device for focus operation, and the like.

The focus ring 7 that detects an operation for manual focus control and the zoom ring 8 that detects an operation for zooming control are one aspect of the operation unit 15.

The camera control unit 16 includes a microcomputer (arithmetic processing device) including a central processing unit (CPU), and performs overall control of the imaging device 1. For example, control of the shutter speed according to an operation of the imaging person, an instruction on various types of signal processing in the signal processing unit 11, imaging operation and recording operation according to an operation of the user, and reproduction operation of a recorded image file are performed.

The camera control unit 16 switches various image capturing modes and the like. Examples of the various image capturing modes include a still image capturing mode, a moving image capturing mode, a continuous image capturing mode for continuously acquiring still images, and the like.

The camera control unit 16 performs user interface control for enabling the user to operate these functions. The user interface (UI) control performs processing of detecting an operation with respect to each operation element 6 provided in the imaging device 1, display processing with respect to the rear monitor 4, operation detection processing, and the like.

Furthermore, the camera control unit 16 instructs the driver unit 18 to control various lenses included in the lens system 9.

For example, processing of specifying an aperture value in order to secure a light amount necessary for auto focus (AF) control, an operation instruction of an aperture mechanism according to the aperture value, and the like are performed.

The memory unit 17 stores information and the like used for processing executed by the camera control unit 16. As the illustrated memory unit 17, for example, a read only memory (ROM), a random access memory (RAM), a flash memory, and the like are comprehensively illustrated.

The memory unit 17 may be a memory area built in a microcomputer chip as the camera control unit 16 or may be configured by a separate memory chip.

Programs and the like used by the camera control unit 16 are stored in the ROM, the flash memory, and the like of the memory unit 17. The ROM, the flash memory, and the like store an operating system (OS) for the CPU to control each unit, content files such as image files, and application programs, firmware, and the like for various operations.

The camera control unit 16 executes the program to control the entire imaging device 1 including the lens barrel 3.

The RAM of the memory unit 17 is used as a work area of the camera control unit 16 by temporarily storing data, programs, and the like used in various data processing executed by the CPU of the camera control unit 16.

The driver unit 18 is provided with, for example, a motor driver for a zoom lens drive motor, a motor driver for a focus lens drive motor, a diaphragm mechanism driver for a motor that drives a diaphragm mechanism, and the like.

Each driver supplies a drive current to a corresponding drive motor according to an instruction from the camera control unit 16.

The sensor unit 19 comprehensively indicates various sensors mounted on the imaging device 1. As the sensor unit 19, for example, a position information sensor, an illuminance sensor, an acceleration sensor, and the like are mounted.

A sensor provided in the focus ring 7 or the zoom ring 8 to detect a rotation direction or an operation amount of the focus ring 7 or the zoom ring 8 is one aspect of the sensor unit 19.

2. FUNCTIONAL CONFIGURATION OF IMAGING DEVICE

The camera control unit 16 executes various functions by executing a program stored in the memory unit 17.

Figure 4:
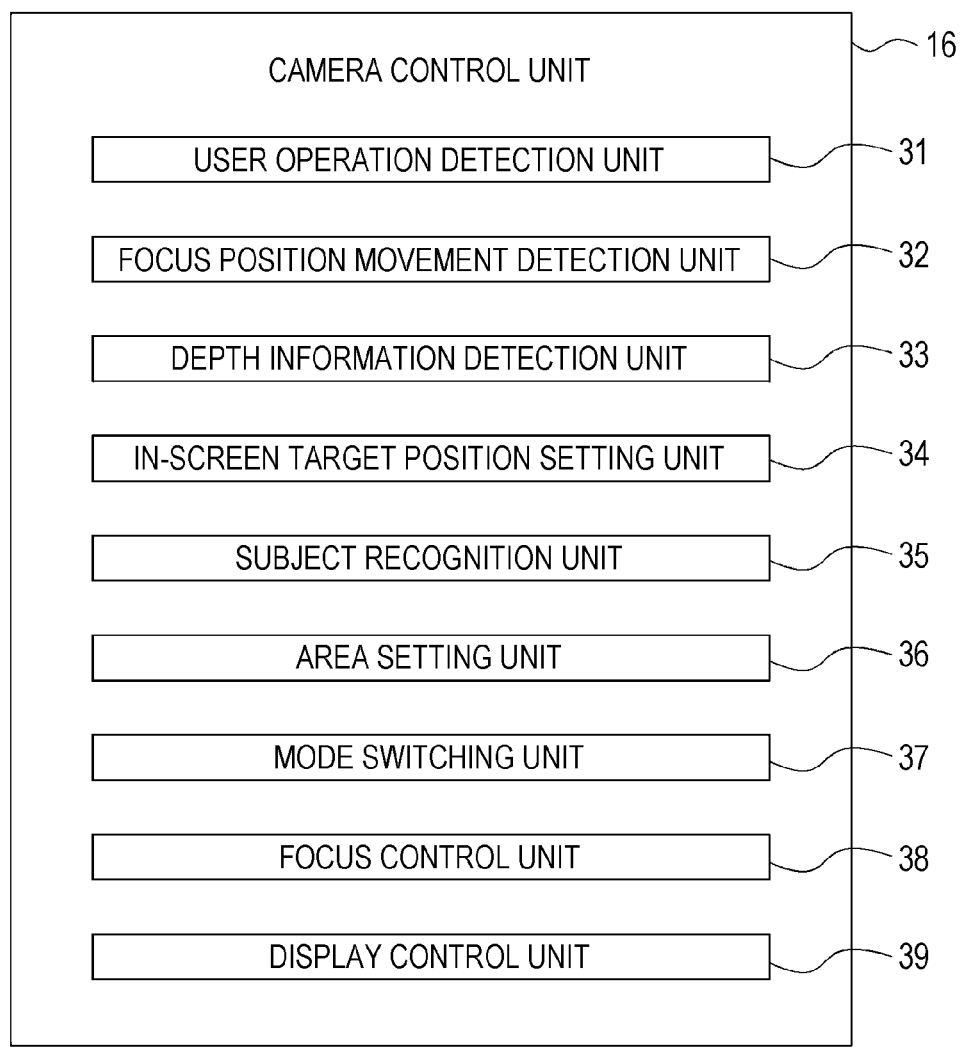
FIG. 4 is a diagram illustrating a functional configuration example of the imaging device.

Each function of the camera control unit 16 will be described with reference to FIG. 4. Note that a part of each function may be included in the signal processing unit 11. In addition, a part of each function may be achieved by cooperation of the camera control unit 16 and the signal processing unit 11.

The camera control unit 16 has functions as a user operation detection unit 31, a focus position movement detection unit 32, a depth information detection unit 33, an in-screen target position setting unit 34, a subject recognition unit 35, an area setting unit 36, a mode switching unit 37, a focus control unit 38, and a display control unit 39.

The user operation detection unit 31 performs processing of detecting a user operation on the operation unit 15. Specifically, a process of detecting an operation of pressing the shutter button 6S, a process of rotating the focus ring 7, a process of detecting an operation of rotating the zoom ring 8, and the like are performed.

The user operation detection unit 31 also detects an operation amount and an operation mode. For example, an operation mode of half pressing the shutter button 6S or an operation mode of full pressing the shutter button 6S, or the like is distinguished and detected.

Furthermore, when detecting an operation of rotating the focus ring 7 or the zoom ring 8, the user operation detection unit 31 detects the rotation direction and the rotation amount.

The user operation detection unit 31 detects the start and end of a user operation for rotating the focus ring 7. Various types of detection of the start of the user operation can be considered, for example, such as determining the start of the user operation by detecting that the user touches the focus ring 7 using a sensor or the like provided for the focus ring 7.

Various types of detection of the end of the user operation can be considered, for example, such as determining the end of the user operation in a case where the state in which the operation on the focus ring 7 is detected changes to a state in which the operation is not detected. Specifically, the end of the user operation may be detected according to an output of a sensor that detects contact of a finger of a person with the focus ring 7, or the end of the user operation may be detected in a case where the operation is not performed for a certain period of time.

The user operation detection unit 31 may detect an operation by the external operation device.

For example, in a case where the operation unit 15 receives an operation signal from the external operation device such as a smartphone, a tablet, a Bluetooth remote controller, a wired remote controller, or a wireless operation device for focus operation, the user operation detection unit 31 may recognize these operations as focus operation.

In the following description, a focus operation on the focus ring 7 will be described as an example, but the present technology can also be applied to a focus operation by these remote operations.

The focus position movement detection unit 32 detects (calculates) a moving direction (moving direction of the focus position) and a moving distance (moving amount of the focus position) of the focus position on the basis of an operation direction and an operation amount of the focus ring 7 detected by the user operation detection unit 31.

Various modes of detecting the moving direction of the focus position can be considered. As an example, a minute operation amount (or a difference in rotation position) of the focus ring 7 detected for each frame (1/60 sec, 1/30 sec, or the like) is acquired, and an operation direction of the user with respect to the focus ring 7, that is, the rotation direction of the focus ring 7 is determined on the basis of a plurality of minute operation amounts.

Furthermore, the moving distance of the focus position can be obtained by integrating minute operation amounts.

In addition, the operation amount may be acquired not every frame but every predetermined time.

For example, the depth information detection unit 33 detects a piece of depth information for each pixel area including a plurality of pixels. The depth information is depth information of the subject, and may be detected on the basis of, for example, a phase difference signal output from an image plane phase difference pixel included in the imaging element unit 10, or may be detected by providing a depth sensor separately from the imaging element unit 10 and receiving reflected light of reference light such as near infrared rays or acquiring distortion or intensity of distribution of the reflected light.

Note that the depth information may be detected for each pixel.

In a case where a focus control target area FA to be described later is set, the depth information may be detected only for the focus control target area FA.

The in-screen target position setting unit 34 sets an in-screen target position PS on the basis of the depth information. The in-screen target position PS is an area set on the captured image, and is an area including a group of pixels having similar depth information. That is, the in-screen target position PS set by the in-screen target position setting unit 34 is an area that can be set for each subject, and is an area in which a subject that is a possible target for the focus control is captured.

Figure 5:
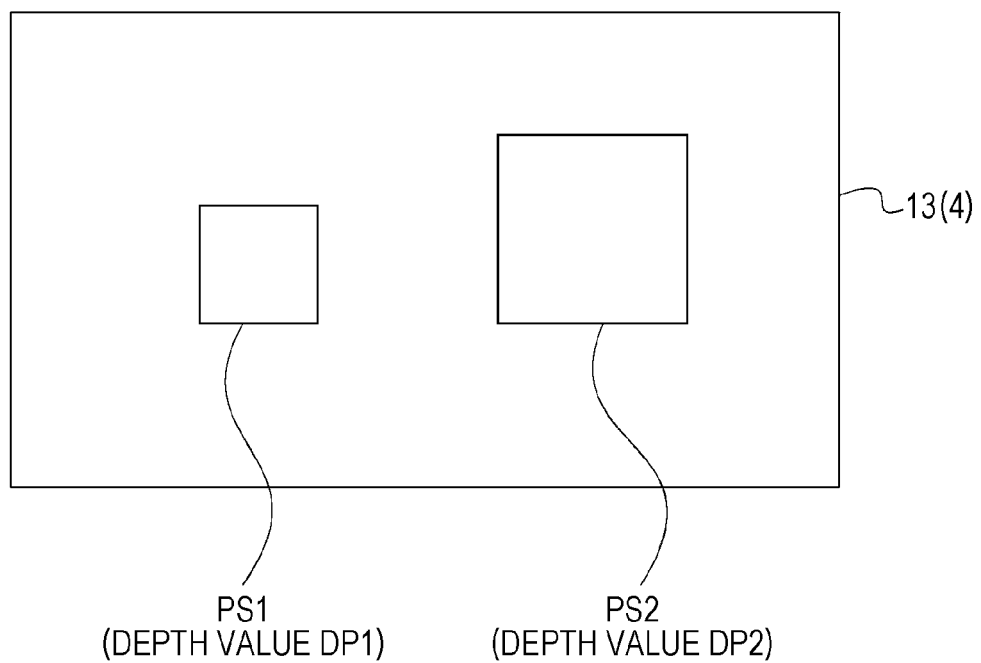
FIG. 5 is a diagram illustrating an example of an in-screen target position.

FIG. 5 illustrates an example of the in-screen target position PS. This is an example in which an in-screen target position PS1 set as a depth value DP1 and an in-screen target position PS2 set as a depth value DP2 are set on the captured image.

The subject recognition unit 35 performs processing of recognizing a subject in the captured image by performing image processing on the captured image. The subject recognition unit 35 may be capable of executing processing of determining the type of the subject. Thus, it is possible to perform appropriate focus control reflecting the user's desire to perform the focus control for a person and the user's desire to perform the focus control for a cat.

Furthermore, the subject recognition unit 35 sets the position of the recognized subject on the captured image as an in-screen subject position PO. The in-screen subject position PO is set to indicate the display position of the subject recognized by the image recognition, unlike the in-screen target position PS set on the basis of the depth information.

The area setting unit 36 sets the focus control target area FA. The focus control target area FA is an area where autofocus control is performed. For example, in a case where a central portion of the captured image is selected as the focus control target area FA, the focus control target is selected from among subjects captured in the central portion. The focus control target area FA can be set in the entire captured image or in a part of the captured image.

The setting of the focus control target area FA may be performed according to an operation of the user, or may be automatically performed by automatically determining a situation by image recognition.

In addition, a plurality of focus control target areas FA may be set. Then, the plurality of focus control target areas FA may be given priority.

The mode switching unit 37 switches various modes. For example, the mode switching unit 37 switches between an AF mode for performing the autofocus control and a manual focus (MF) mode for performing the manual focus control. The switching processing is executed, for example, when the user operation detection unit 31 detects that the user has operated the operation element 6 for switching between the AF mode and the MF mode. Alternatively, the switching processing may be executed by detecting a menu operation of the user.

The mode switching unit 37 switches a plurality of types of AF modes. Examples of the AF mode include a tracking focus mode in which the focus control is performed according to movement of a subject set as the focus control target, a single focus mode in which the focus control is performed only once in a case where the shutter button 6S is half-pressed, and the like. These switching is performed according to a menu operation of the user.

In particular, in the present embodiment, the mode switching unit 37 temporarily switches to the MF mode by detecting a specific user operation during execution of the AF mode. Furthermore, in the temporary MF mode, the end of a specific user operation is detected and the mode is switched again to the AF mode. That is, by the user performing a specific operation in the AF mode, the mode transitions to the MF mode, and by ending the specific operation, the mode transitions to the AF mode again.

The specific user operation is, for example, a rotation operation of the focus ring 7. During the AF mode, the focus ring 7 is rotated in the circumferential direction to temporarily transition to the MF mode.

The focus control unit 38 performs the autofocus control corresponding to each mode. For example, in the single focus mode, lens drive control is performed so as to focus on the subject in the focus control target area. Furthermore, in the tracking focus mode, lens drive control for keeping focusing on the focus control target is performed according to movement of the focus control target (particularly, movement in the optical axis direction).

Furthermore, when the AF mode is switched to the temporary MF mode by the above-described specific user operation, the focus control unit 38 performs processing of estimating the focus control target (subject) changed according to a manual operation mode of the focus ring 7 by the user. Then, when the specific user operation ends and the AF mode is set, control to focus on the estimated new focus control target is performed. For example, in a case where tracking focus control has been performed before the temporary MF mode, the tracking focus control is performed for a new focus control target when the mode returns from the temporary MF mode to the AF mode again.

Note that the processing of estimating the changed new focus control target may be executed after returning from the temporary MF mode to the AF mode.

In order to perform such focus control, the focus control unit 38 sets a target focus position. In the setting of the target focus position, in the tracking focus mode, the in-focus state of the focus control target is maintained by executing processing of finely adjusting the target focus position according to the movement of the focus control target. The fine adjustment of the target focus position is performed, for example, on the basis of the depth information.

Furthermore, when shifting to the temporary MF mode, the focus control unit 38 performs the focus control on the basis of the operation direction (the rotation direction of the focus ring 7) and the operation amount in a specific operation of the user detected by the user operation detection unit 31. Specifically, when returning to the AF mode again, the focus control unit 38 calculates the moving direction and the moving distance of the focus position on the basis of the operation direction and the operation amount in the specific operation, and estimates a new focus control target. Then, the estimated focus control target is selected to reset the target focus position. A specific example of processing of estimating and selecting a new focus control target will be described later.

The display control unit 39 performs display processing of displaying a menu screen to the user using the display unit 13, display processing of displaying a captured image, display processing of displaying a warning or the like, and the like.

The display control unit 39 executes processing of displaying the through image. When displaying the through image, the display control unit 39 superimposes and displays a frame image on the subject recognized by the subject recognition unit 35. The frame image may be changed according to the focus state of the subject.

For example, the frame image to be superimposed on a subject that is selected as the focus control target is a first frame image FP1 that is a solid-line frame. Furthermore, the frame image to be superimposed on a subject that is not selected as the focus control target is a second frame image FP2 that is a broken-line frame.

Figure 6:
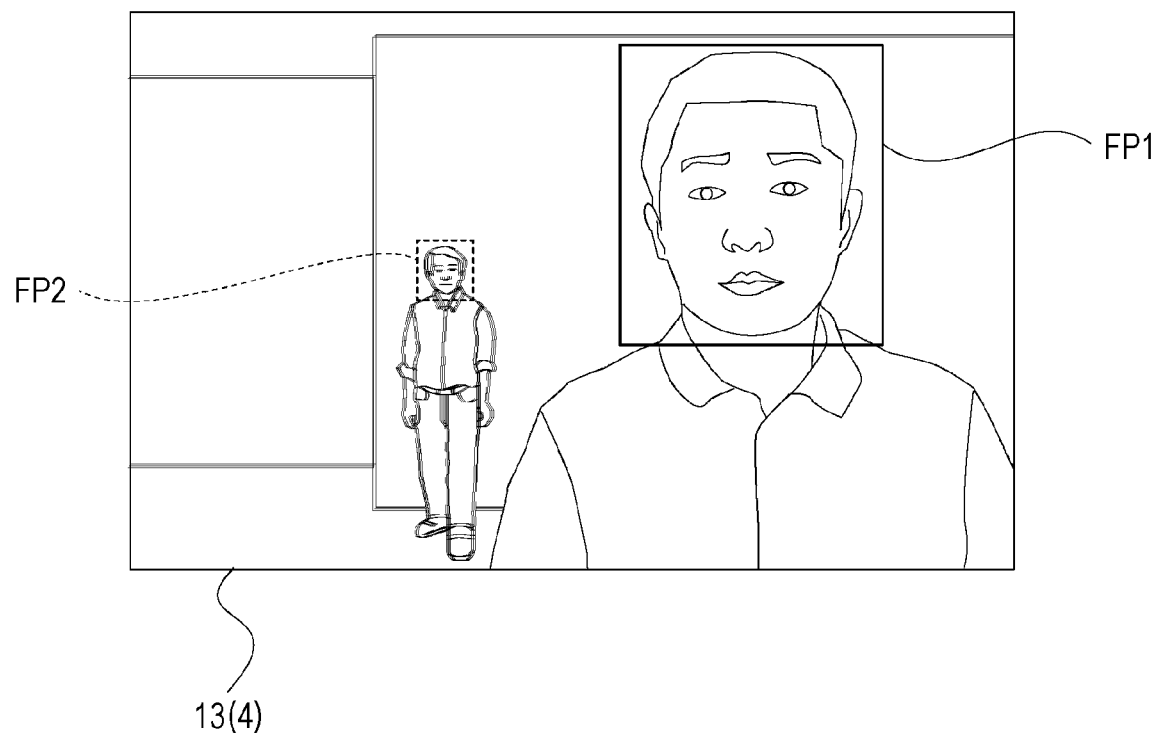
FIG. 6 is a diagram illustrating an example of a first frame image and a second frame image.

Specifically, an example of the first frame image FP1 and the second frame image FP2 is illustrated in FIG. 6.

The image illustrated in FIG. 6 illustrates a state in which two persons are recognized as subjects by the subject recognition unit 35. One of the two persons is regarded as a close subject, and the other is regarded as a far subject.

Furthermore, the focus control unit 38 is in a state of selecting the close subject as the focus control target.

The focus control unit 38 performs the focus control on the focus control target to focus on a close subject. Furthermore, a far subject is out of focus.

The display control unit 39 superimposes and displays the first frame image FP1 on the subject as the focus control target selected by the focus control unit 38.

Furthermore, the display control unit 39 superimposes and displays the second frame image FP2 on other subjects.

Note that various frame images can be considered as frame images to be superimposed and displayed on the image on the display unit 13 by the display control unit 39. For example, instead of a rectangular frame, a circular or elliptical frame may be superimposed and displayed. Alternatively, a rectangular frame may be superimposed on each of the four corners of the subject being recognized to indicate an area where the subject is displayed. In addition, the frames of the first frame image FP1 and the second frame image FP2 may be hatched.

Furthermore, while FIG. 6 illustrates an example in which the display modes of the subject as the focus control target and other subjects are changed depending on the line type, they may be distinguished by a line color or a line thickness, or may be distinguished by combining them.

In addition, the subject as the focus control target and other subjects may be displayed separately without using a frame. For example, depth map display for displaying the subject by changing the display color according to the depth amount may be performed, or peaking display for displaying the subject by changing the display color according to the contrast amount in the screen may be performed.

3. SELECTION EXAMPLE OF FOCUS CONTROL TARGET

As described above, in the imaging device 1, a new focus control target is selected when transitioning to the AF mode again on the basis of a user operation when shifting from the AF mode to the temporary MF mode.

Here, some examples will be described for selection examples of the new focus control target.

<3-1. First Selection Example>

A first selection example is an example in which, in a case where the user performs an operation of rotating the focus ring 7 when transitioning to the temporary MF mode, the new focus control target is selected according to the rotation position of the focus ring 7 at the end time point of the user operation.

Figure 7:
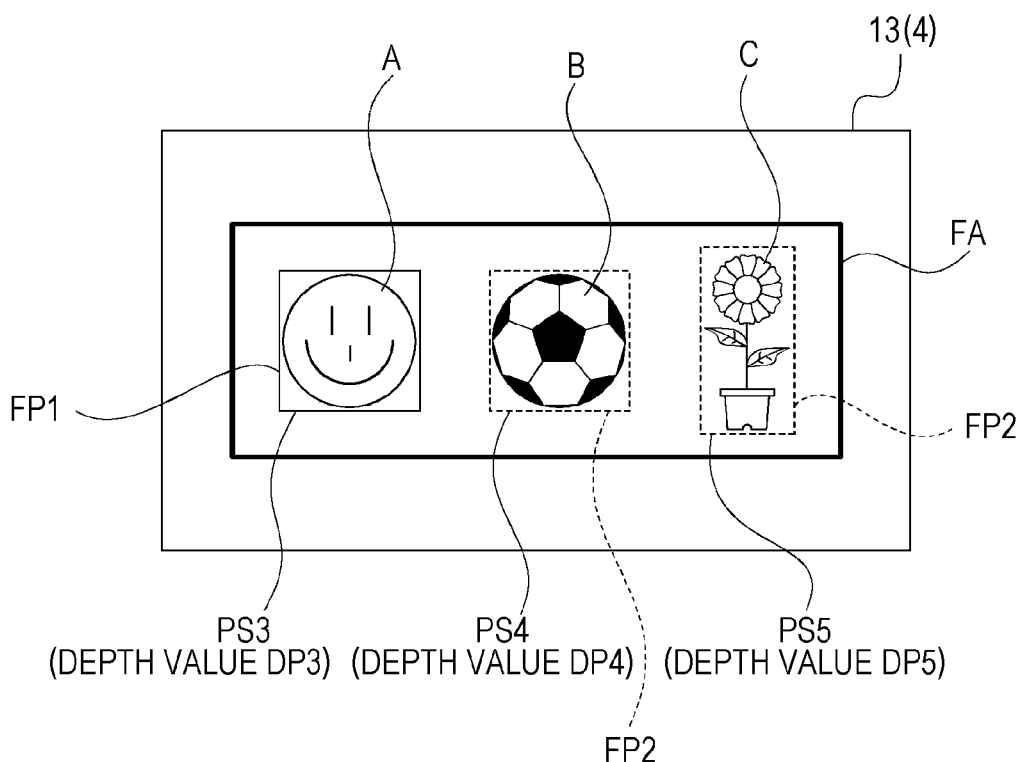
FIG. 7 is a diagram illustrating an example of a through image displayed on a rear monitor.

FIG. 7 illustrates an example of the through image displayed on the rear monitor 4 as the display unit 13. On the display unit 13, the focus control target area FA is displayed by a thick frame line. Furthermore, in the display unit 13, respective in-screen target positions PS3, PS4, and PS5 for three subjects recognized on the basis of the depth information by the in-screen target position setting unit 34 within the frame of the focus control target area FA are indicated by frame images.

The subject located at the in-screen target position PS3 is a subject A of a smile mark, the subject located at the in-screen target position PS4 is a subject B of a soccer ball, and the subject located at the in-screen target position PS5 is a subject C of a plant.

Figure 8:
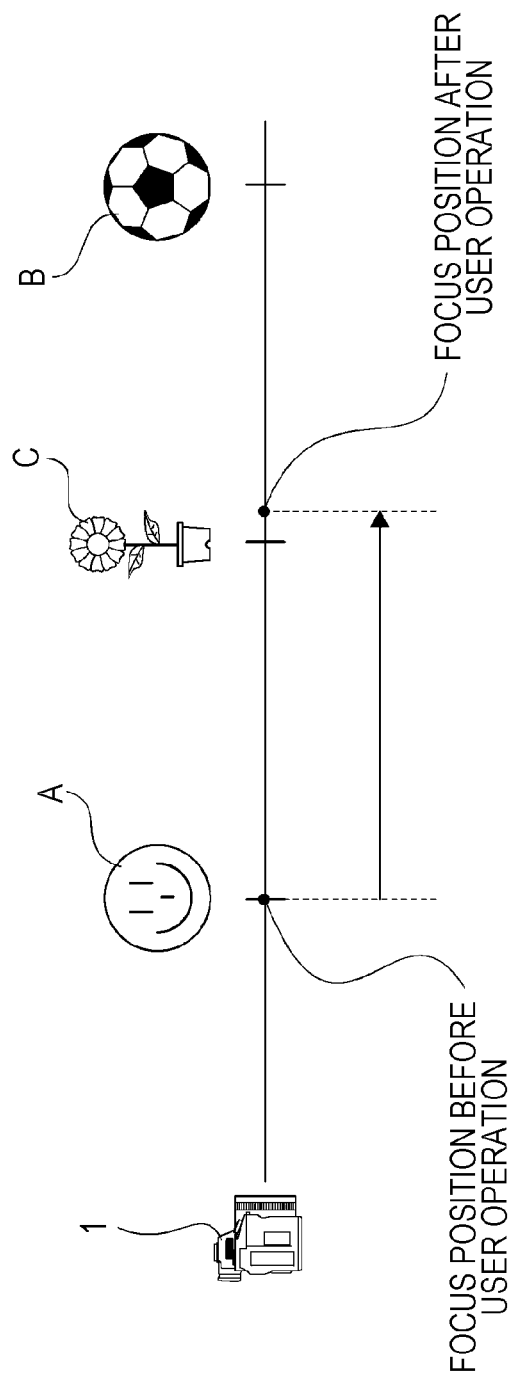
FIG. 8 is a diagram for describing a positional relationship between the imaging device and a subject and an example of movement of a focus position by a user operation.

Here, the subjects A, B, and C are located at different positions in the depth direction. That is, distances from the imaging device 1 to the respective subjects are different as illustrated in FIG. 8.

Then, as illustrated in FIG. 7, a depth value of the in-screen target position PS3 is set as a depth value DP3, a depth value of the in-screen target position PS4 is set as a depth value DP4, and a depth value of the in-screen target position PS5 is set as a depth value DP5.

Furthermore, the magnitude relationship among the depth value DP3, the depth value DP4, and the depth value DP5 is set as depth value DP3<depth value DP5<depth value DP4. That is, the subject A is the closest to the imaging device 1, the subject C is the next closest to the imaging device 1, and the subject B is the farthest from the imaging device 1 (see FIG. 8).

Figure 9:
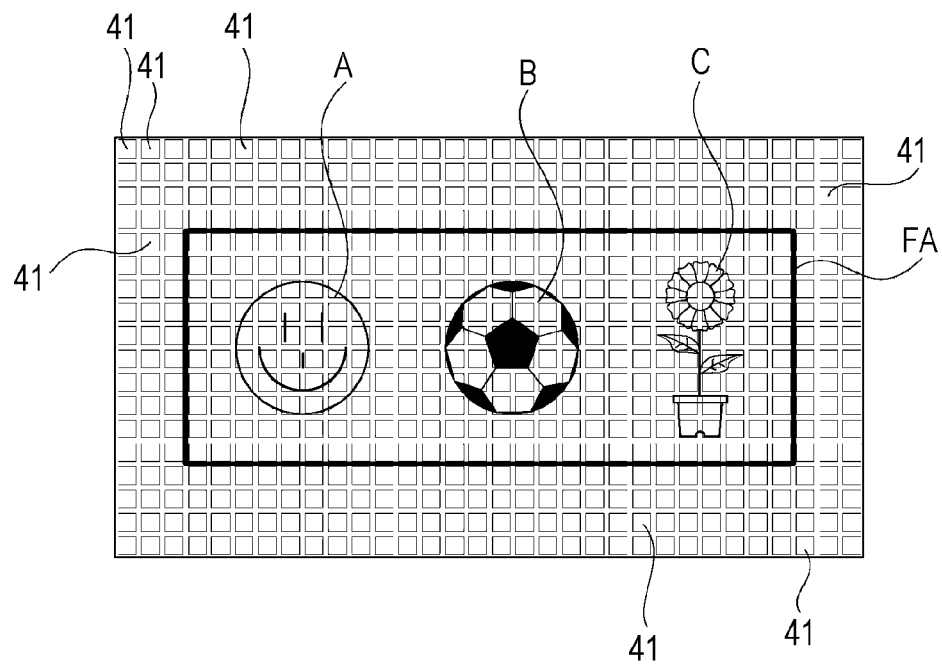
FIG. 9 is a diagram illustrating an example of a small area to be a calculation target of depth information.

Note that, as illustrated in FIG. 9, the depth information is calculated for each small area 41 including a plurality of pixels.

In the case of the example illustrated in FIG. 7, the subject A is selected as the focus control target, and the first frame image FP1 as a solid-line frame image is superimposed and displayed at the position. Thus, the area of the in-screen target position PS3 is indicated as the focus control target in the screen.

The subject B is not selected as the focus control target, and on its position, the second frame image FP2 as a broken-line frame image is superimposed. Thus, an area of the in-screen target position PS4 is indicated as a subject that is not the focus control target in the screen.

The subject C is not selected as the focus control target, and on its position, the second frame image FP2 as a broken-line frame image is superimposed. Thus, an area of the in-screen target position PS5 is indicated as a subject that is not the focus control target in the screen.

In this manner, it is assumed that, at a time point before the user performs an operation on the focus ring 7, the subject A is selected as the focus control target (see FIGS. 7 and 8). That is, the focus position before the user operation is the position of the subject A.

Here, by the user operating the focus ring 7, the imaging device 1 transitions from the tracking focus mode to the temporary MF mode.

Then, it is assumed that, by the user operating the focus ring 7, the focus position moves to a position between the subject C and the subject B and close to the subject C (see FIG. 8).

In a case where the user finishes the operation of the focus ring 7 in this state, the imaging device 1 estimates the user's intention and selects a subject as the focus control target.

Figure 10:
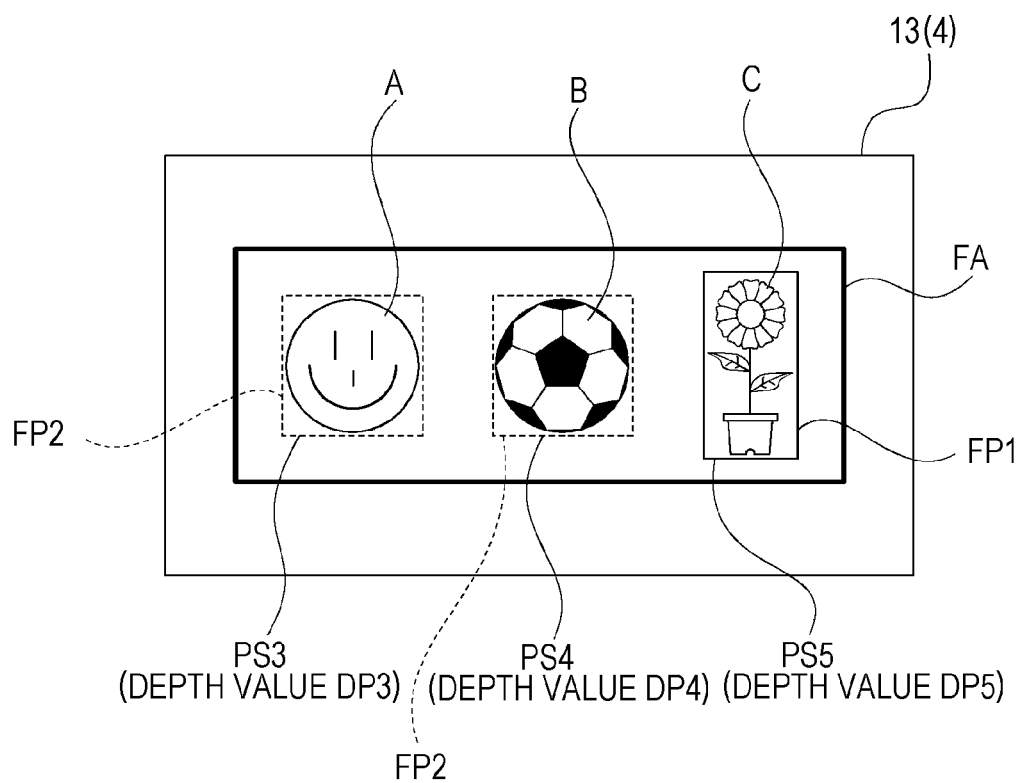
FIG. 10 is a diagram for describing that a focus control target is changed by the user operation.

In the first selection example, the subject C, which is the subject closest to the focus position after the user operation, is selected as the focus control target. Thus, on the display unit 13, the in-screen target position PS5 for the subject C is indicated by the first frame image FP1 that is a solid-line frame image, and the in-screen target positions PS3 and PS4 for the subjects A and B are indicated by the second frame images FP2 which are broken-line frame images (see FIG. 10).

Note that, in the present example, an example has been described in which the in-screen target position PS is set for each subject detected on the basis of the depth information by the in-screen target position setting unit 34, and the focus control target is selected from the in-screen target positions PS, but other examples are also conceivable.

For example, in a case where the in-screen target position PS set for each subject detected by the in-screen target position setting unit 34 on the basis of the depth information matches the in-screen subject position PO set for each subject recognized by the subject recognition unit 35 performing image processing, it may be indicated on the display unit 13 as a possible focus control target. Alternatively, possible focus control targets may be indicated on the display unit 13 only on the basis of the in-screen subject position PO without using the in-screen target position PS.

Then, according to the present example, the subject closest to the focus position after the user operation is selected as the focus control target from among subjects detected as subjects in both the detection processing by the depth information and the detection processing by the image recognition processing, thereby preventing the focus control on the inappropriate subject from being performed.

<3-2. Second Selection Example>

In a second selection example, a new focus control target is selected in consideration of the moving direction of the focus position, that is, the rotation direction of the focus ring 7.

Figure 11:
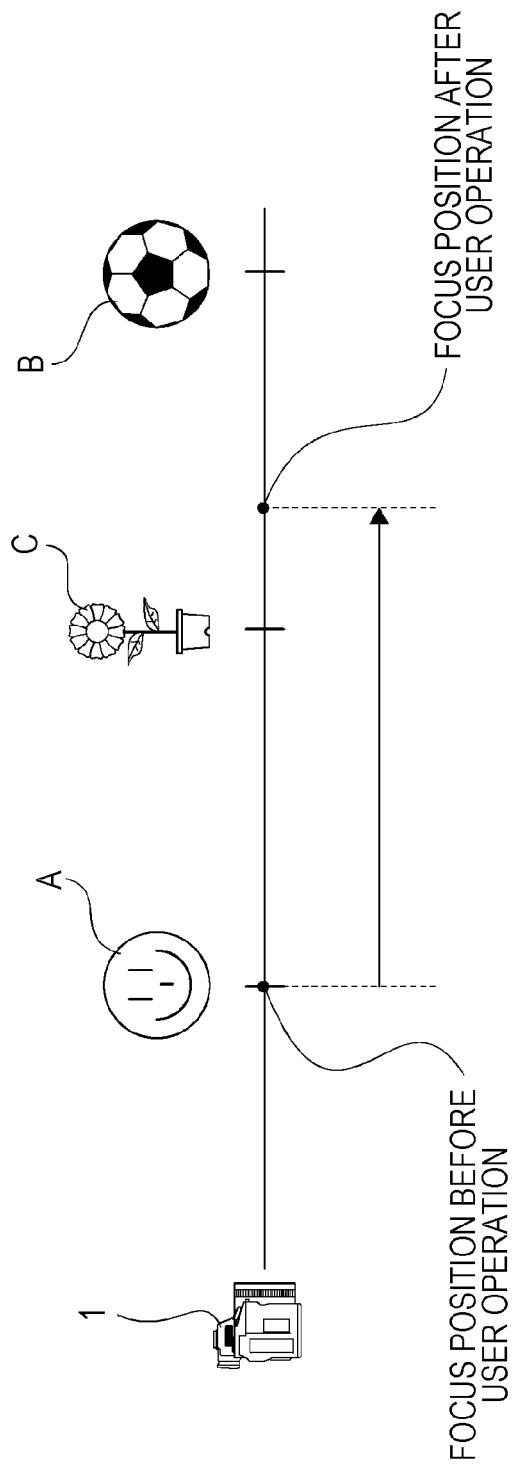
FIG. 11 is a diagram for describing another example of the positional relationship between the imaging device and the subject and the movement of the focus position by the user operation.

FIG. 11 is a diagram illustrating a positional relationship between the imaging device 1 and the subjects A, B, and C. Furthermore, FIG. 11 illustrates the focus position before an operation of the user and the focus position after the operation.

As illustrated in the drawing, similarly to the first selection example, the second selection example illustrates a state in which, by the user operates the focus ring 7, the imaging device 1 transitions from the tracking focus mode to the temporary MF mode, and then by the user operating the focus ring 7, the focus position is moved to a position between the subject C and the subject B and close to the subject C. That is, the focus position at the end time point of the user operation (end time focus position) is set as the position between the subject C and the subject B.

Here, in the second selection example, the subject closest to the focus position after the user operation is the subject C, but instead of simply selecting the subject C as the focus control target, the focus control target is selected in consideration of the rotation direction of the focus ring 7. This is synonymous with selecting the focus control target in consideration of the moving direction of the focus position.

Specifically, it is determined whether or not the deviation between the focus position and the position of the subject C after the user operation is equal to or more than a predetermined threshold. Then, in a case where it is determined that the deviation is equal to or more than the predetermined threshold, the imaging device 1 estimates that the focus control target intended by the user is not the subject C but the subject B ahead in the moving direction of the focus position.

Figure 12:
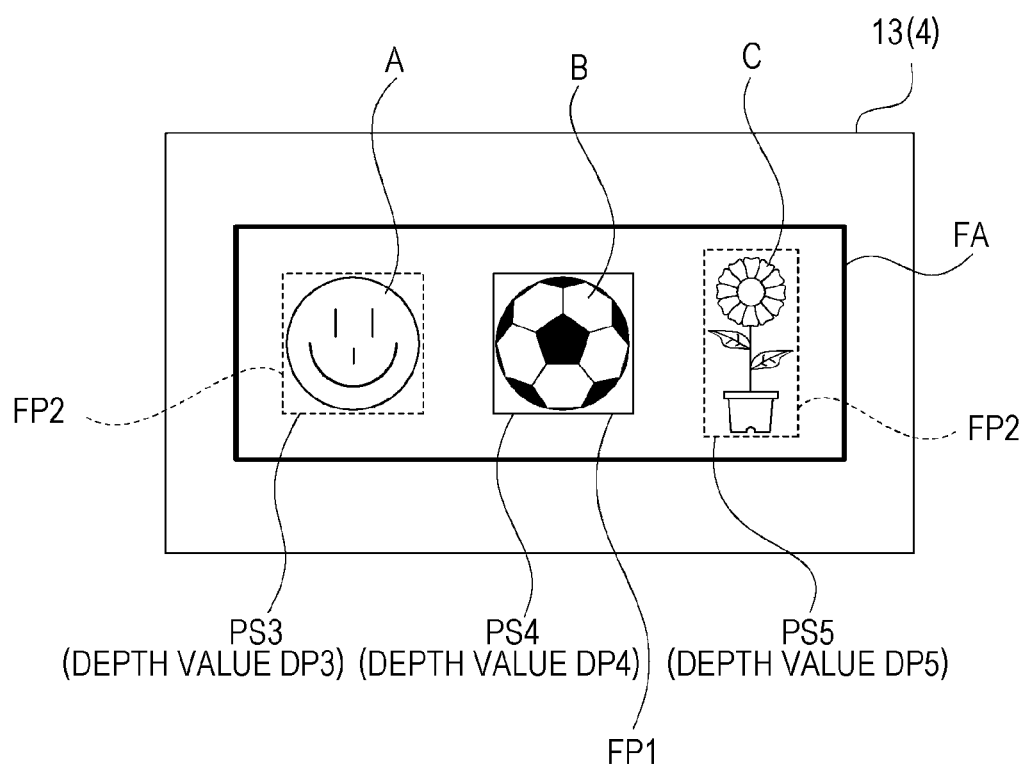
FIG. 12 is a diagram for describing another example in which the focus control target is changed by the user operation.

Therefore, as illustrated in FIG. 12, the imaging device 1 selects the subject B as the focus control target. Thus, the subject B is indicated by the first frame image FP1 on the display unit 13.

Note that, similarly to the first selection example, the focus control target may be selected by further using the in-screen subject position PO for each subject recognized by the subject recognition unit 35 by image processing.

<3-3. Third Selection Example>

In a third selection example, a new focus control target is selected in consideration of the moving direction of the focus position and the focus control target area FA.

Figure 13:
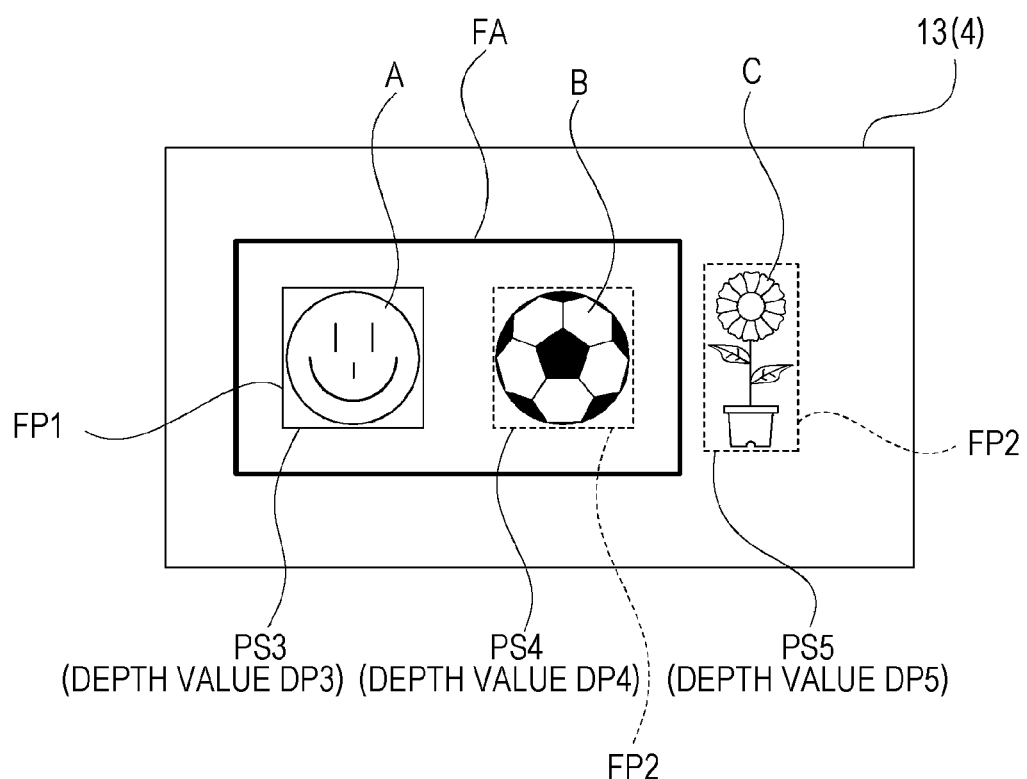
FIG. 13 is a diagram illustrating an example in which the in-screen target position is set to each of an inside and an outside of a focus control target area.

FIG. 13 illustrates a relationship between the focus control target area FA set in the tracking focus mode and each subject. That is, the subject A and the subject B are located in the focus control target area FA, and the subject C is located outside the focus control target area FA.

Furthermore, the subject A is selected as the focus control target.

Figure 14:
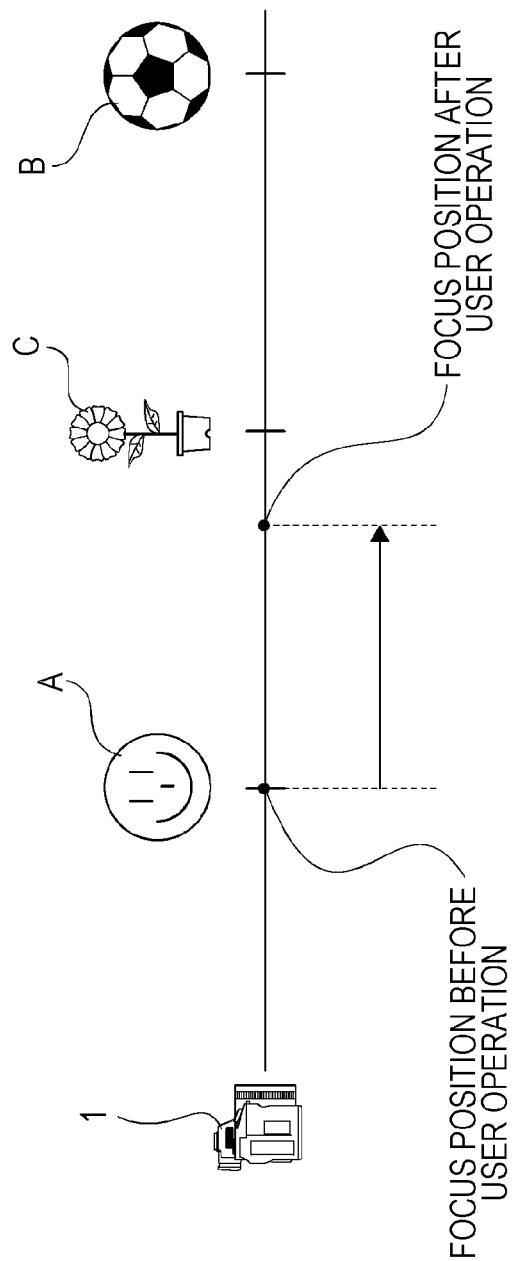
FIG. 14 is a diagram for describing still another example of the positional relationship between the imaging device and the subject and the movement of the focus position by the user operation.

FIG. 14 illustrates a state in which the user performs a rotation operation of the focus ring 7 in this state to change the focus position and the focus position. As illustrated, the subject C and the subject B are located ahead in the moving direction of the focus position as viewed from the end time focus position. Then, the subject C is closer to the focus position than the subject B.

In the state illustrated in FIG. 14, the subject C is located ahead in the moving direction, but the subject C is a subject located outside the focus control target area FA as illustrated in FIG. 13.

Here, in the first selection example and the second selection example described above, the subject as the focus control target is selected without considering the focus control target area FA. Therefore, depending on conditions, a subject outside the focus control target area FA may be selected as the focus control target.

Specifically, as illustrated in FIGS. 13 and 14, in a case where the user performs the rotation operation of the focus ring 7, the subject C located outside the focus control target area FA is selected as the focus control target in the first selection example and the second selection example.

On the other hand, in the third selection example, by selecting the focus control target in consideration of the focus control target area FA, the following occurs.

That is, since the subject C is located ahead in the moving direction of the focus position but is located outside the focus control target area FA, the subject B is selected as the focus control target.

Note that although FIG. 13 illustrates an example in which the in-screen target position PS5 is set for the subject C outside the focus control target area FA, the subject for which the in-screen target position PS is set may be limited to the subject in the focus control target area FA.

Note that, similarly to the first selection example, the focus control target may be selected by further using the in-screen subject position PO for each subject recognized by the subject recognition unit 35 by image processing.

<3-4. Other Selection Examples>

In another selection example, in a case where a specific operation of the user is detected in the MF mode, the mode transitions to the MF mode (the above-described temporary MF mode) as a preparation stage before shifting to the AF mode, and thereafter transitions to the AF mode in response to detection of the end of the specific operation. Then, in the AF mode, the focus control for a new focus control target estimated in the MF mode as the preparation stage is executed.

Figure 15:
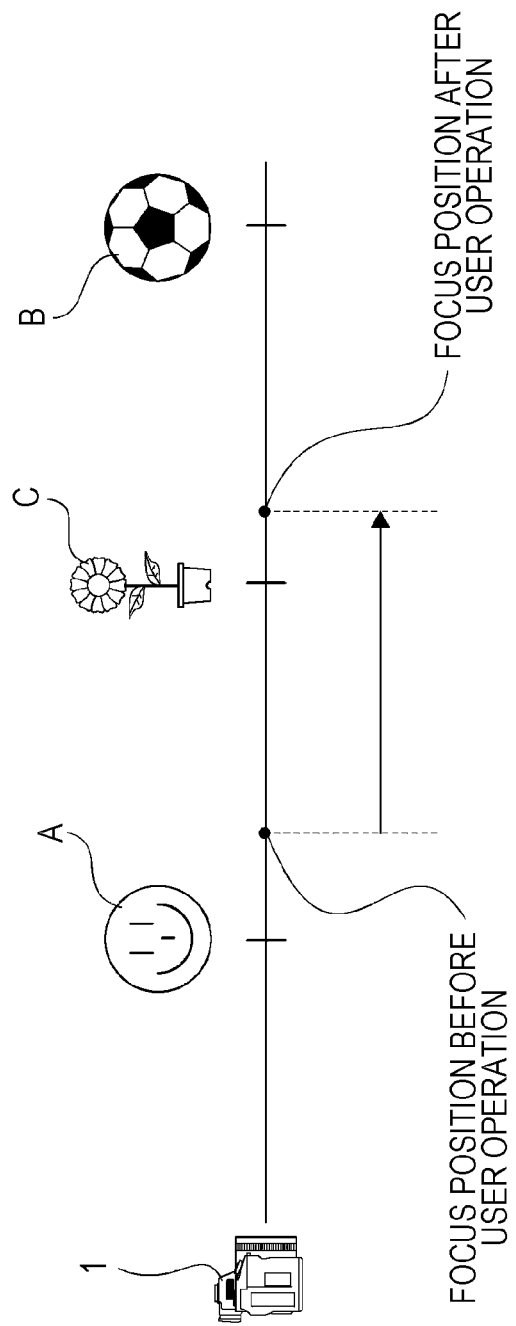
FIG. 15 is a diagram for describing yet another example of the positional relationship between the imaging device and the subject and the movement of the focus position by the user operation.

This will be specifically described with reference to FIG. 15.

In a state before detection of the specific operation by the user, the focus position is a position between the subject A and the subject C.

In this state, it is assumed that the user performs a specific operation (rotation operation of the focus ring 7) to move the focus position to a position between the subject C and the subject B.

Then, in a case where the user ends the specific operation, the mode shifts to the AF mode. The focus control target at this time corresponds to the specific operation of the user.

For example, as in the first selection example, the subject C closest to the end time focus position may be selected as the focus control target.

Alternatively, as in the second selection example, instead of selecting the subject C closest to the end time focus position as the focus control target, the subject B may be selected as the focus control target in consideration of the rotation direction of the focus ring 7.

Alternatively, as in the third selection example, in consideration of the end time focus position, the rotation direction of the focus ring 7, and the focus control target area FA, the subject inside the focus control target area FA and located ahead in the moving direction of the focus position may be selected as the focus control target.

After selecting a new focus control target, the tracking focus control is performed in accordance with the movement of the selected subject.

Note that, although the example of transitioning to the tracking focus mode after the end of the specific operation by the user has been described here, a subject as the focus control target may be automatically selected and focused, and thereafter the transition to the MF mode may be performed again. In this case, a state of what is called "focus lock" is set. That is, as long as the subject as the focus control target does not move, the state of focusing on the subject is maintained.

4. EXAMPLE OF DISPLAY MODE ON DISPLAY UNIT

Here, an example of a display mode in the display unit 13 will be described.

Figure 16:
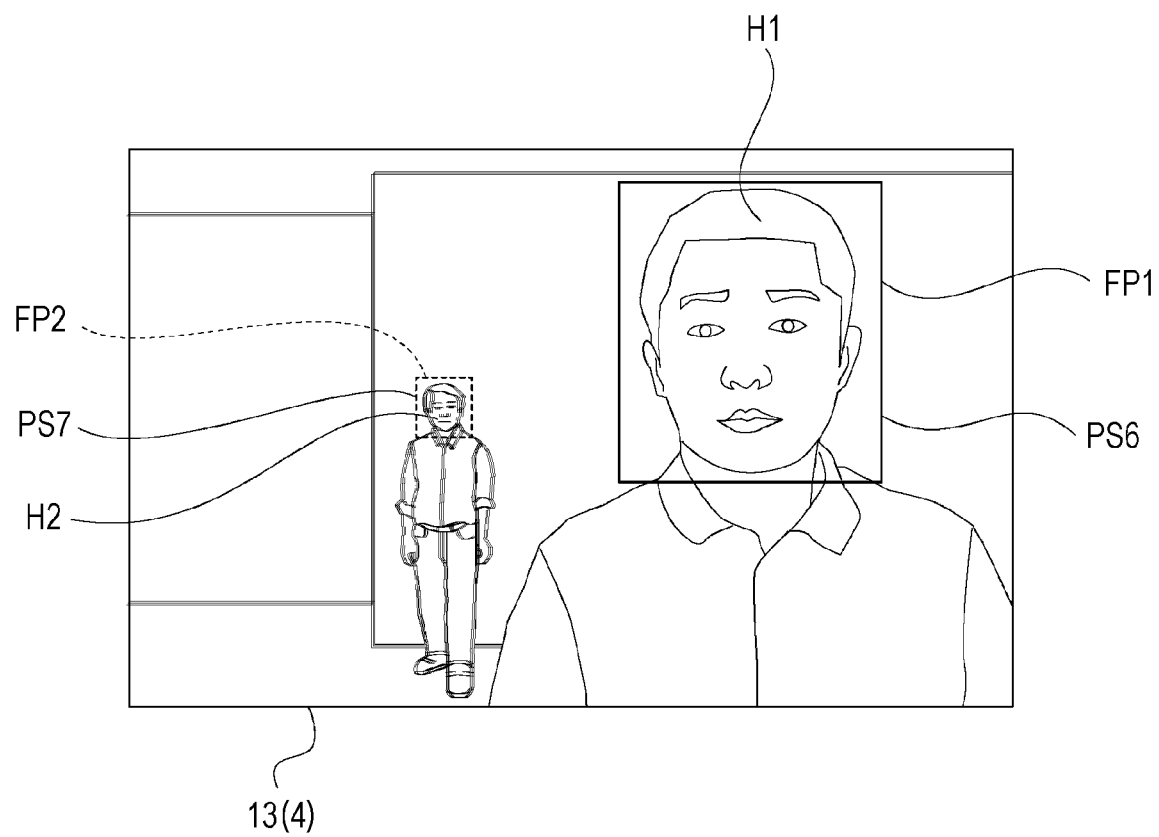
FIG. 16 is a diagram illustrating an example in which the focus control target is changed for a moving subject together with FIGS. 17 and 18, and this diagram is a diagram illustrating a state before the focus control target is changed.

FIG. 16 illustrates a scene in which tracking focus is performed as the AF mode. As illustrated, on the display unit 13, with respect to a through image in which the subject H1 on the near side and the subject H2 on the deep side are captured, an in-screen target position PS6 corresponding to a subject H1 is indicated by the first frame image FP1, and an in-screen target position PS7 corresponding to a subject H2 is indicated by the second frame image FP2.

In this state, it is assumed that the user performs a rotation operation of the focus ring 7 to move the focus position to a far side (subject side), and ends the operation of the focus ring 7.

At this time, the imaging device 1 transitions to the temporary MF mode during the operation of the focus ring 7, and thereafter returns to the AF mode (in this case, the tracking focus mode) again.

Figure 17:
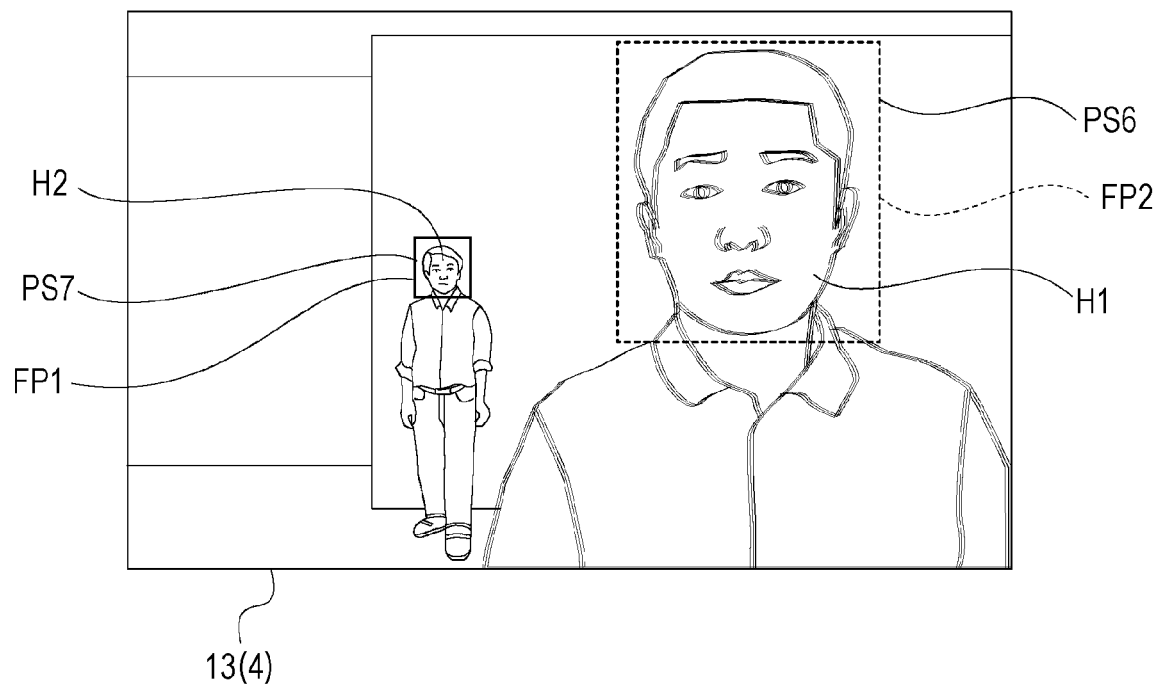
FIG. 17 is a diagram illustrating a state after the focus control target is changed.

After returning to the tracking focus mode, the imaging device 1 selects the subject H2 as a new focus control target according to the relationship between the focus position and the subject position at the end time point of the rotation operation of the focus ring 7, the rotation direction of the focus ring 7, and the like. Thus, as illustrated in FIG. 17, in the through image displayed on the display unit 13, the in-screen target position PS7 of the subject H2 selected as the new focus control target is indicated by the solid-line first frame image FP1, and the in-screen target position PS6 of the subject H1 not to be the focus control target is indicated by the broken-line second frame image FP2.

Figure 18:
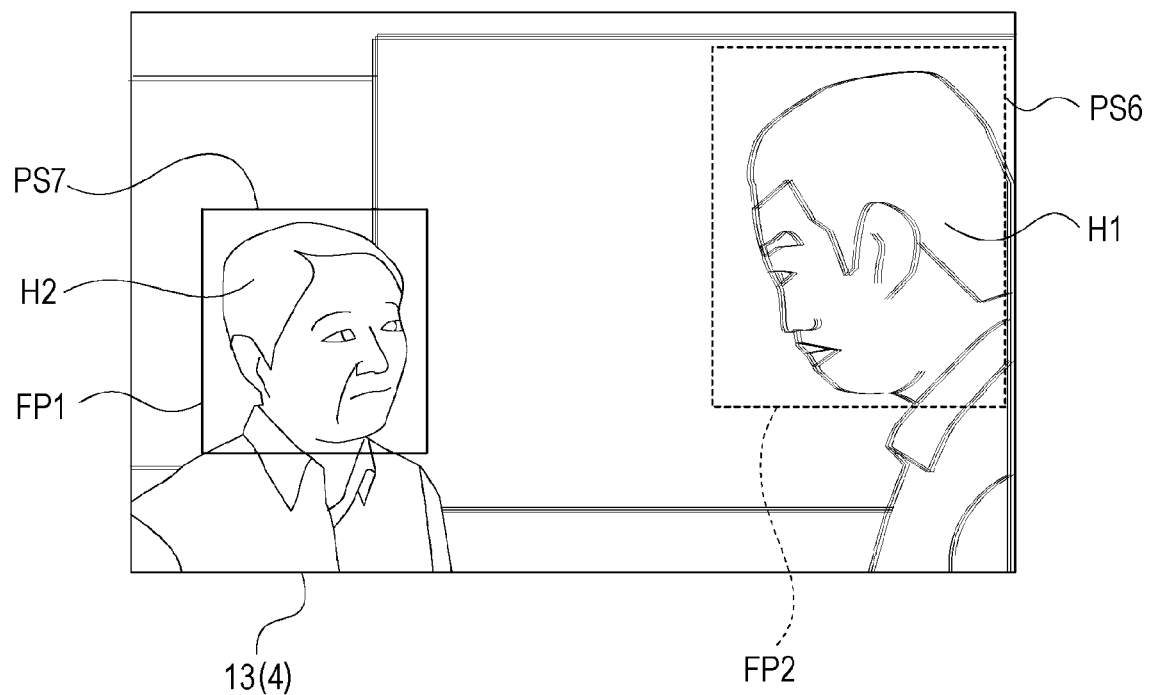
FIG. 18 is a diagram illustrating a state in which a subject selected as the focus control target has moved toward the imaging device.

Thereafter, in a case where the subject H2 moves toward the imaging device 1, the focus control in the tracking focus mode is executed, to thereby change the focus position according to the change in the position of the subject H2. That is, even if the subject moves, the imaging device 1 continues to focus on the tracking target subject (see FIG. 18).

By interposing a user operation on the focus ring 7 during the tracking focus mode, it is possible to keep focusing on the subject while changing the tracking target subject to the subject intended by the user.

Note that another example of the display mode of the in-focus state on the display unit 13 will be described with reference to FIGS. 19 to 22.

Figure 19:
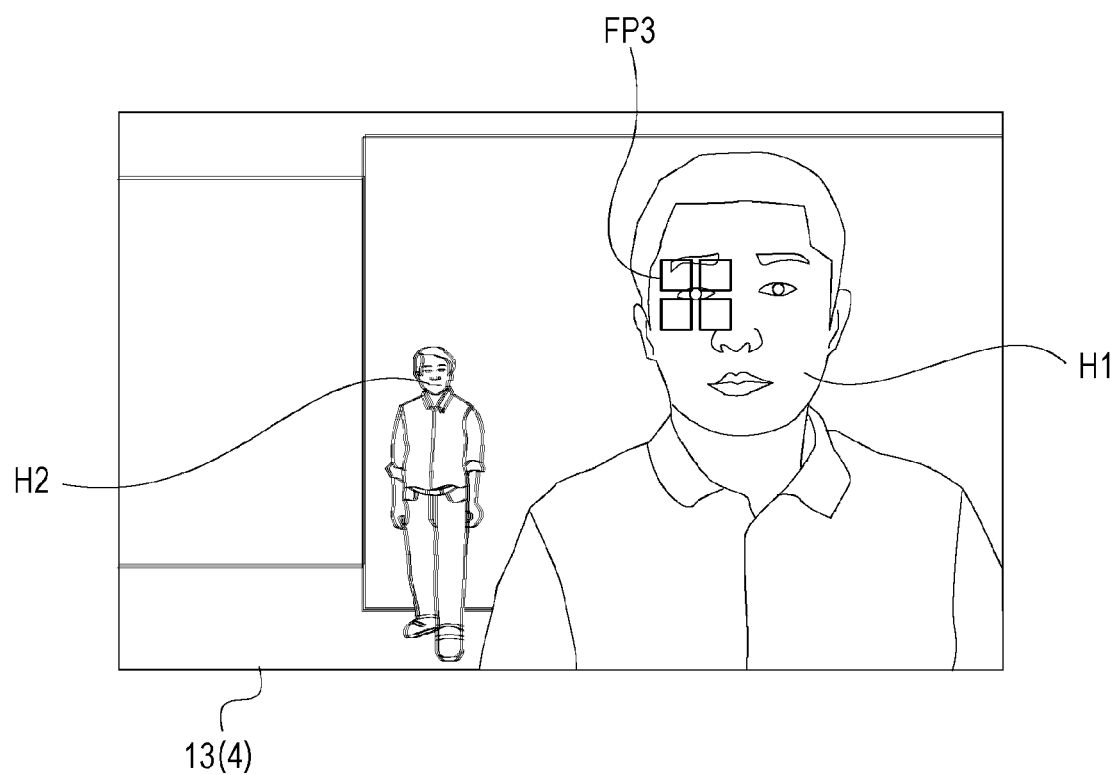
FIG. 19 is a diagram illustrating another example of a display mode of the subject selected as the focus control target together with FIGS. 20, 21, and 22, and this diagram is a diagram illustrating a state before the focus control target is changed.

FIG. 19 is a diagram illustrating a through image in the tracking focus mode. Furthermore, the focus control target is the subject H1, and a third frame image FP3 including four frame images is superimposed and displayed on the pupil area, thereby indicating that focusing is performed on the pupil of the subject H1.

At this time, no frame image is superimposed on the subject H2. However, the imaging device 1 has already recognized the subject H1 and the subject H2 on the basis of the depth information and a result of the image processing.

Figure 20:
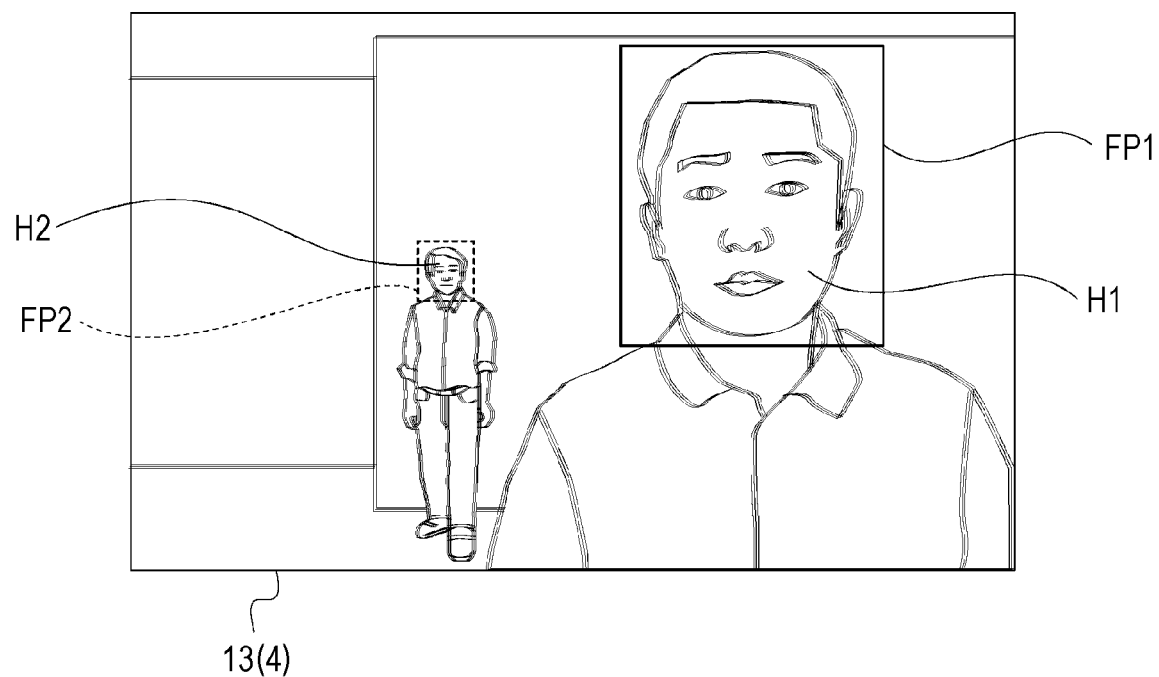
FIG. 20 is a diagram illustrating a state in which a focus ring is being operated.

When the user performs a rotation operation of the focus ring 7, the imaging device 1 transitions from the tracking focus mode to the temporary MF mode. FIG. 20 illustrates a state in which the focus position is moved to the far side by the operation of the user, that is, a state in which the focus position is located between the subject H1 and the subject H2.

As illustrated, although the focus control target is the subject H1, the focus position is shifted from the pupil position, and the in-focus state with respect to the pupil could not be maintained, causing a state in which the first frame image FP1 is superimposed on the subject H1. That is, the user can grasp that the in-focus state with respect to the pupil could not be maintained due to a change in the display mode of the frame image.

Figure 21:
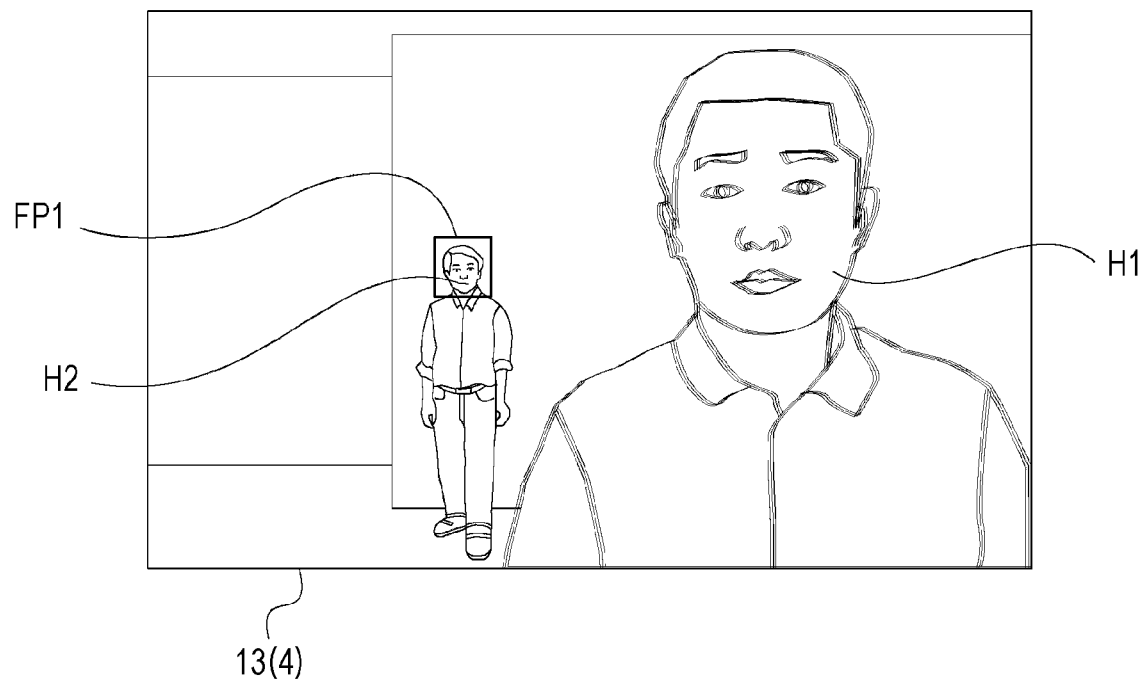
FIG. 21 is a diagram illustrating a state after the focus control target is changed.

When the user finishes the rotation operation of the focus ring 7 in the state illustrated in FIG. 20, the imaging device 1 transitions from the temporary MF mode to the tracking focus mode again. At this time, a subject to be a new focus control target (tracking target) is selected. Here, the subject H2 is selected as the new focus control target, and this state is illustrated in FIG. 21.

As illustrated, the first frame image FP1 is superimposed on the subject H2 that is the focus control target. This state indicates that the subject H2 is the focus control target, and also indicates that the pupil position is not recognized and the focus control on the pupil is not performed.

Figure 22:
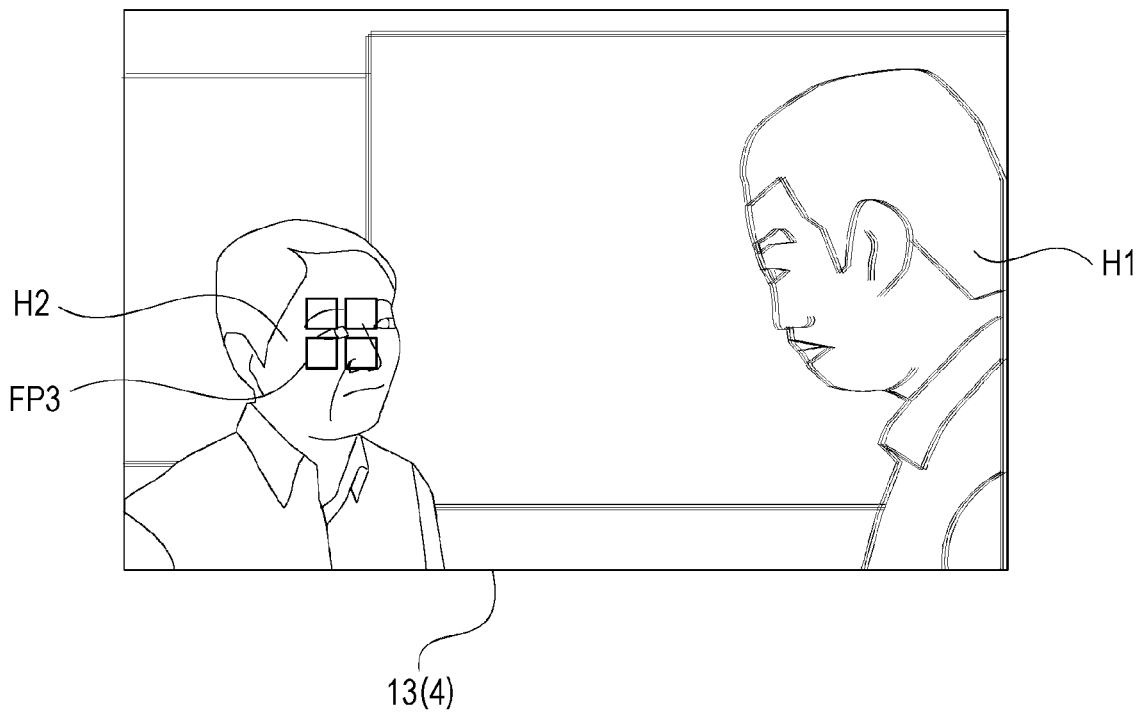
FIG. 22 is a diagram illustrating a state in which the subject selected as the focus control target has moved toward the imaging device.

Next, in a case where the subject H2 moves so as to approach the imaging device 1, a through image as illustrated in FIG. 22 is displayed on the display unit 13.

In this state, when the subject H2 approaches the imaging device 1, the pupil position of the subject H2 can be recognized, and the pupil of the subject H2 is appropriately focused.

Therefore, the third frame image FP3 including four frame images is superimposed and displayed on the pupil portion of the subject H2.

Note that no frame image is superimposed and displayed for the subject H1, but the imaging device 1 has already recognized the subject H1 on the basis of the depth information and the result of the image processing.

5. PROCESSING EXAMPLE

A flow of processing executed by the camera control unit 16 of the imaging device 1 to implement the above-described various functions will be described with an example.

<5-1. Overall Flow>

Figure 23:
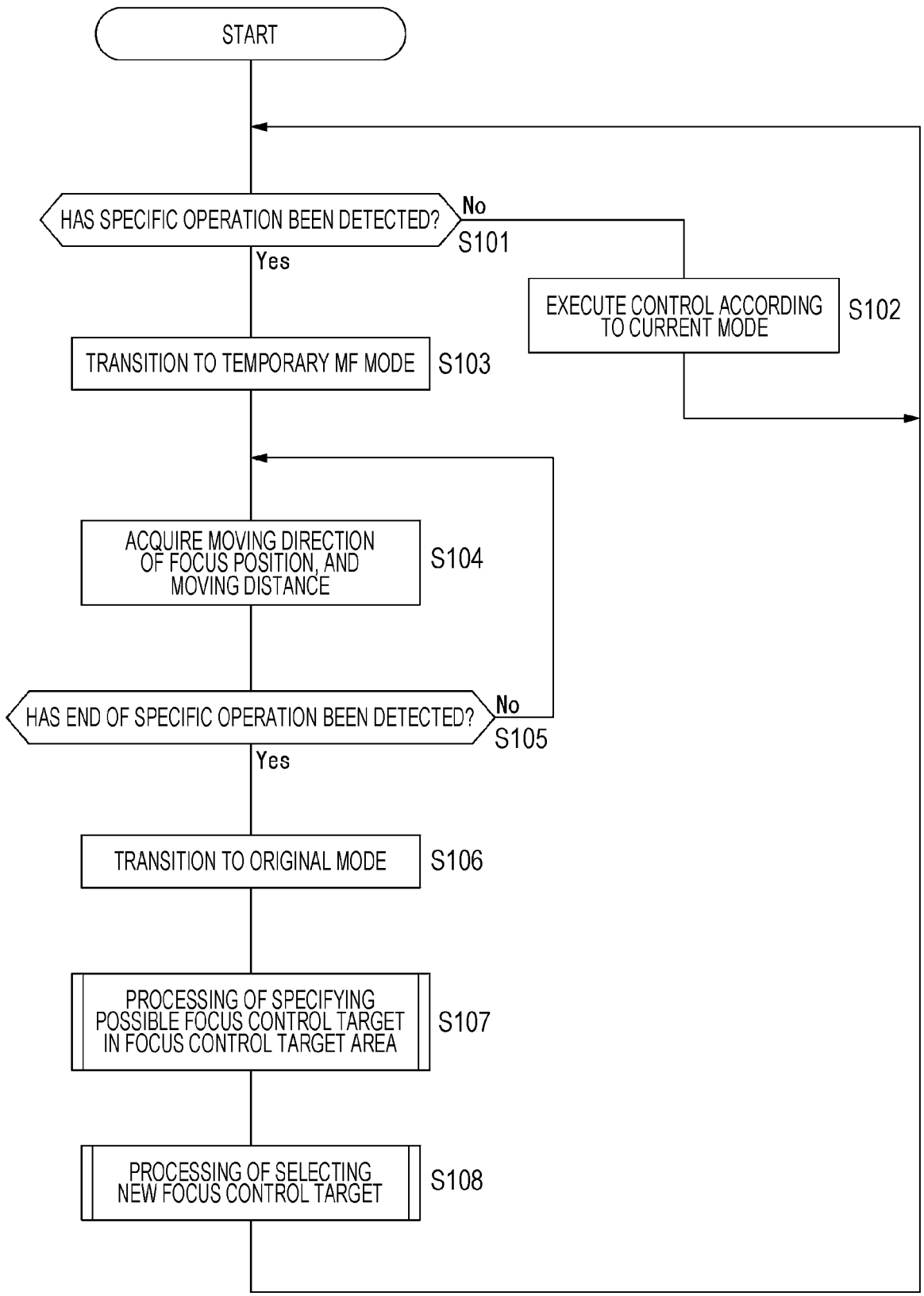
FIG. 23 is a flowchart illustrating an example of processing executed by a camera control unit.

In step S101 in FIG. 23, the camera control unit 16 determines whether or not a specific operation has been detected. The specific operation is, for example, the above-described rotation operation of the focus ring 7, and is an operation performed in a case where it is desired to manually change the focus control target in the AF mode, in a case where it is desired to change the focus control target in the MF mode, in a case where it is desired to smoothly shift to the AF mode while changing the focus control target in the MF mode, or the like.

In a case where it is determined that the specific operation has not been detected, the camera control unit 16 proceeds to step S102 and executes control according to the current mode. For example, when the current mode is the tracking focus mode, the focus position is moved according to the movement of the subject of the focus control target, and the focus is kept on the subject. Furthermore, in a pupil AF mode in which the pupil is automatically focused, control to focus on the pupil is performed by detecting the pupil of the subject.

On the other hand, in a case where it is determined that the specific operation has been detected, the camera control unit 16 proceeds to step S103 and changes the mode to the temporary MF mode. Moreover, in step S104, the camera control unit 16 acquires the moving direction of the focus position (the rotation direction of the focus ring 7) and the moving distance of the focus position (the operation amount of the focus ring 7).

In step S105, the camera control unit 16 determines whether or not the end of the specific operation has been detected. The camera control unit 16 repeats the process of step S104 until the end of the specific operation is detected. Note that, although not illustrated, driving of the lens system 9 in accordance with the specific operation of the user is executed in the imaging device 1 until the end of the specific operation of the user is detected, thereby achieving manual adjustment of the focus position by the user.

On the other hand, in a case where it is determined that the end of the specific operation has been detected, the camera control unit 16 proceeds to step S106 and performs processing of transitioning to the AF mode before transitioning to the MF mode. The case where the end of the specific operation has been detected is, for example, a case where a state in which the user's finger touches the focus ring 7 is changed from a detected state to a non-detected state, or the like.

In step S107, the camera control unit 16 acquires information in the focus control target area FA.

Two examples of the information acquisition processing in the focus control target area FA will be described.

Figure 24:
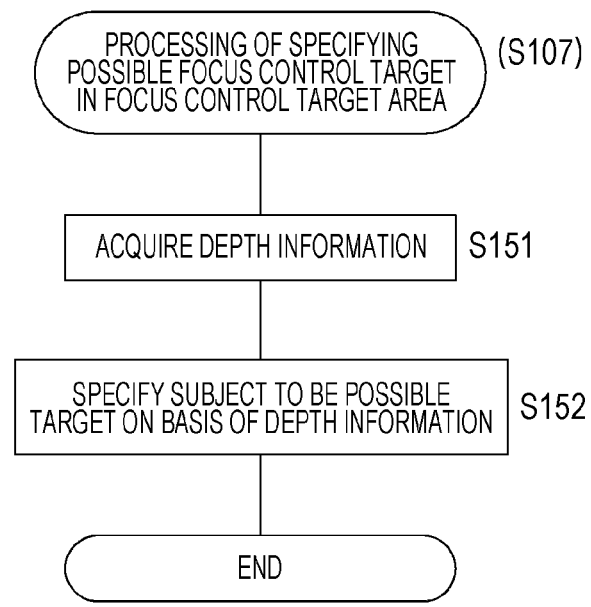
FIG. 24 is a flowchart illustrating a first example of processing of acquiring information in the focus control target area.

A first example is illustrated in FIG. 24. In step S151, the camera control unit 16 acquires the depth information in the focus control target area FA.

Next, in step S152, the camera control unit 16 specifies a subject to be a possible focus control target on the basis of the acquired depth information.

Figure 25:
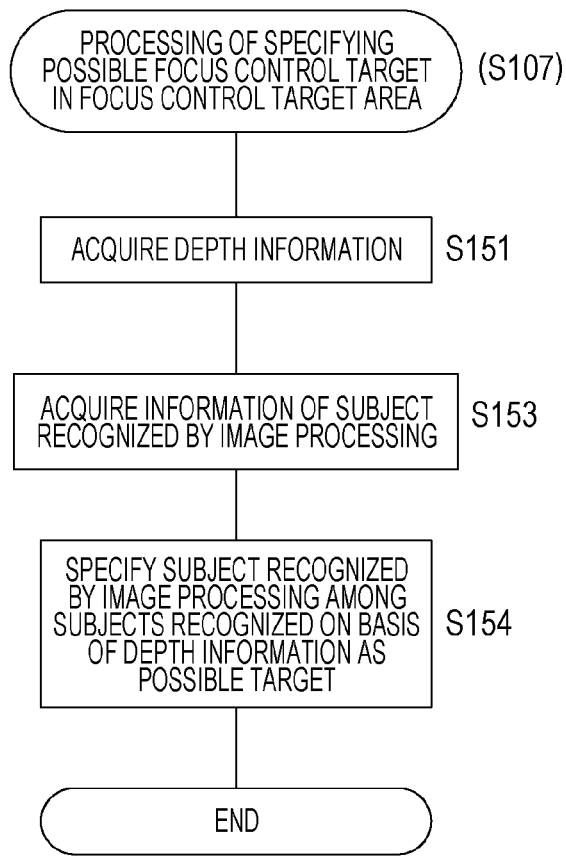
FIG. 25 is a flowchart illustrating a second example of processing of acquiring information in the focus control target area.

A second example is illustrated in FIG. 25. In step S151, the camera control unit 16 acquires the depth information. Subsequently, in step S153, the camera control unit 16 acquires information of the subject recognized by the image processing.

Next, in step S154, the camera control unit 16 selects the subject recognized in step S153 as the possible focus control target among the subjects recognized on the basis of the depth information. That is, the example illustrated in FIG. 25 is an example in which it is selected as the possible focus control target in a case where the in-screen target position PS set for each subject detected by the in-screen target position setting unit 34 on the basis of the depth information and the in-screen subject position PO set for each subject recognized by the subject recognition unit 35 performing the image processing match.

The description returns to FIG. 23.

After selecting or specifying the possible focus control target, the camera control unit 16 sets a new focus control target in step S108 on the basis of the moving direction and the moving distance of the focus position acquired in step S104 in the MF mode and the depth information in the focus control target area FA acquired in step S107.

Note that, as a result based on these pieces of information, it may be determined not to change the focus control target. For example, in a case where an appropriate subject is not detected, or the like, the focus control target is not changed.

After executing the process of step S108, the camera control unit 16 returns to step S101, determines again whether or not the specific operation has been detected, and in a case where the specific operation has not been detected, control according to the current mode is executed in step S102.

That is, in a case where a new focus control target is selected in step S108, the tracking focus control is executed by setting an object target distance according to the subject selected as the new focus control target in step S102 until the next specific operation is detected.

<5-2. First Example of Processing of Selecting Focus Control Target>

Figure 26:
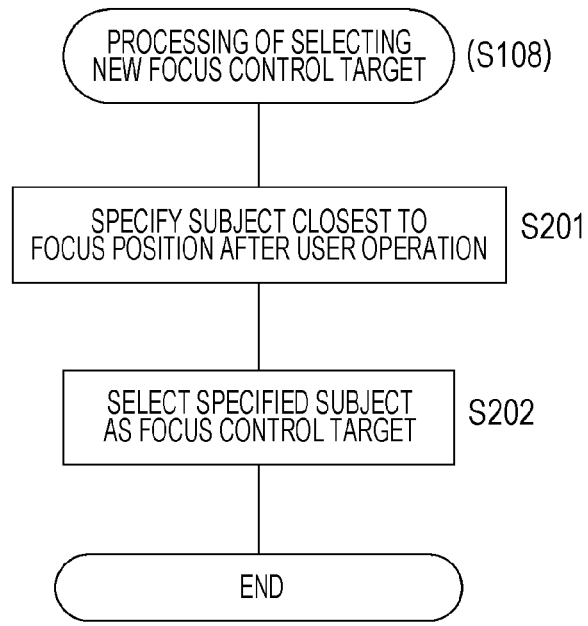
FIG. 26 is a flowchart of a first example of processing of selecting a new focus control target.

A first example of the processing of selecting a new focus control target illustrated in step S108 of FIG. 23 will be described with reference to FIG. 26.

The first example corresponds to the first selection example of the focus control target described above.

In step S201, the camera control unit 16 specifies the subject closest to the focus position after the user operation, that is, the end time focus position from among the subjects extracted as possible subjects.

Subsequently, in step S202, the camera control unit 16 selects the specified subject as the focus control target.

Thus, the selection mode described in the first selection example is achieved.

<5-3. Second Example of Processing of Selecting Focus Control Target>

Figure 27:
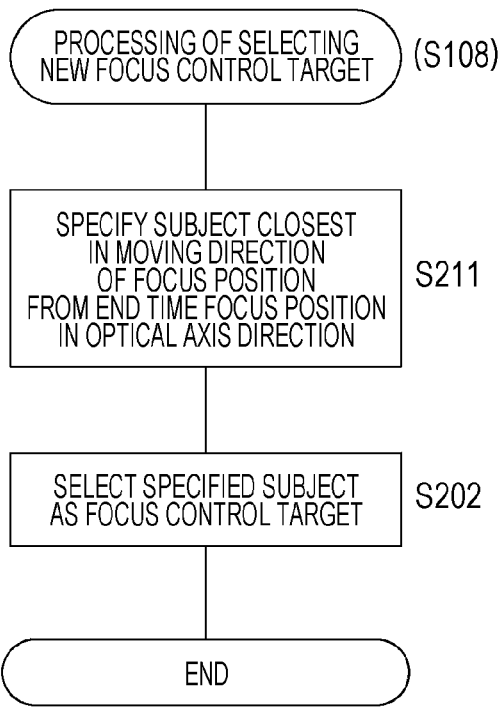
FIG. 27 is a flowchart of a second example of processing of selecting a new focus control target.

A second example of the processing of selecting a new focus control target will be described with reference to FIG. 27.

The second example corresponds to the second selection example of the focus control target described above.

In step S211, the camera control unit 16 specifies the closest subject among the subjects located ahead of the end time focus position in the moving direction of the focus position.

Subsequently, in step S202, the camera control unit 16 selects the specified subject as the focus control target.

Thus, the selection mode described in the second selection example is achieved.

<5-4. Third Example of Processing of Selecting Focus Control Target>

A third example of processing of selecting a new focus control target will be described with reference to FIG. 23 described above.

The third example corresponds to the third selection example of the focus control target described above.

The camera control unit 16 performs respective processes of step S101 to step S106 in FIG. 23 to thereby perform the process of detecting the specific operation of the user and transitioning to the temporary MF mode, and thereafter performs the process of detecting the end of the specific operation and transitioning to the original mode again. Since each process is similar to each process denoted by the same reference numeral described in the first example, a detailed description thereof will be omitted.

Next, instead of step S107, the camera control unit 16 acquires information regarding the entire area regardless of the focus control target area FA. Specifically, specification of the subject based on the depth information and specification of the subject by image processing are performed for the entire area.

Next, in step S108, the camera control unit 16 performs processing of selecting a new focus control target from among the subjects specified in the focus control target area FA.

However, in a case where there is no possible subject in the focus control target area FA, a new focus control target is selected from among subjects outside the focus control target area FA.

This can be achieved by acquiring information for the entire area in step S107.

For example, in a case where the imaging device 1 cannot be moved in accordance with the movement of the subject, the subject may be temporarily located outside the focus control target area FA. Even in such a case, it is possible to select an appropriate subject as the focus control target by acquiring information on the outside of the focus control target area FA.

Note that information on the focus control target area FA may be acquired in step S107 in FIG. 23. Also in this case, the subject C (see FIG. 13) located outside the focus control target area FA is not focused, and the subject B in the focus control target area FA is appropriately focused. Furthermore, by limiting the information to be acquired to the focus control target area FA, it is possible to reduce the burden of processing executed by the imaging device 1.

<5-5. Fourth Example of Processing of Selecting Focus Control Target>

Figure 28:
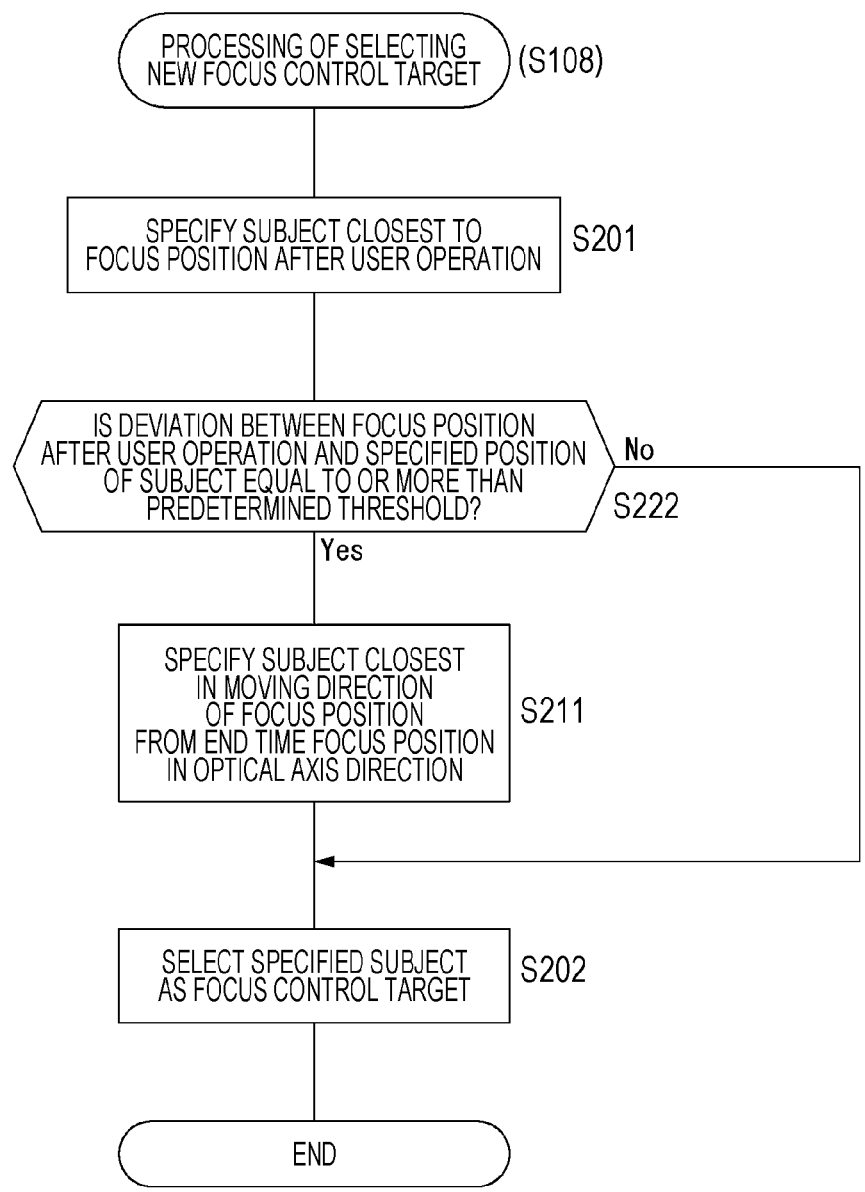
FIG. 28 is a flowchart of a fourth example of processing of selecting a new focus control target.

A fourth example of the processing of selecting a new focus control target executed in step S108 in FIG. 23 will be described with reference to FIG. 28.

The fourth example is an example in which the first example and the second example are selectively used according to conditions.

In order to select a new focus control target, the camera control unit 16 specifies the subject closest to the focus position after the user operation in step S201. The specified subject is a subject that can be selected as the focus control target depending on conditions.

Subsequently, in step S222, the camera control unit 16 determines whether or not a distance (deviation) between the focus position after the user operation and the position of the specified subject is equal to or more than a predetermined threshold.

In a case where it is determined that the distance is less than the predetermined threshold, that is, in a case where it is determined that the focus position after the user operation and the position of the subject are close, the camera control unit 16 selects the specified subject as a new focus control target in step S202.

On the other hand, in a case where it is determined that the distance between the focus position after the user operation and the position of the specified subject is equal to or more than the predetermined threshold, the camera control unit 16 specifies the closest subject among the subjects located ahead of the end time focus position in the moving direction of the focus position in step S211.

Then, in step S202, the camera control unit 16 selects the specified subject as a new focus control target.

By performing such processing, a subject intended by the user can be selected as the focus control target.

6. FOCUS MOVING SPEED CONTROL

In each of the above-described examples, it is conceivable to adjust, to the operation mode of the user, the time and speed (focus moving speed) from selection of the subject as the focus control target until actual focusing.

For example, a case is considered in which the user gradually moves the focus position from the subject H1 toward the subject H2 by slowly moving the focus ring 7, and thereafter ends the user operation before the focus position moves to the position of the subject H2. At this time, the imaging device 1 can immediately focus on the subject H2 after estimating that the subject suitable as the focus control target is the subject H2.

However, lens driving for focusing on the subject H2 may be performed slowly in consideration of the operation mode in which the user slowly moves the focus ring 7 to move the focus position.

Thus, the user can specify the speed (time) to focus in the focus control only by changing the operation mode, and thus, it is possible to achieve preferred autofocus control by a simple operation. Thus, the convenience of the user is improved.

Figure 29:
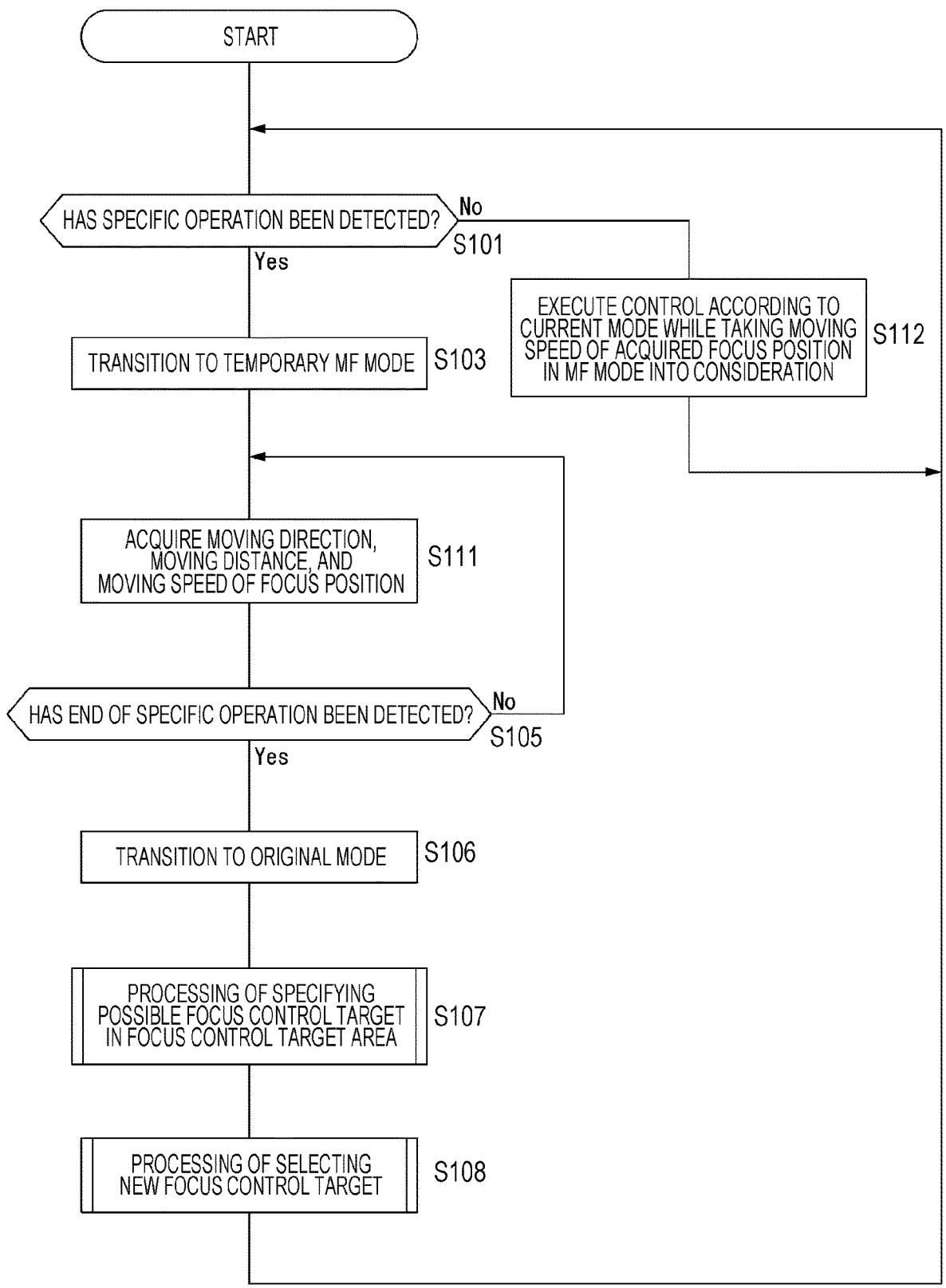
FIG. 29 is a flowchart in a case where a focusing speed for a subject of a focus control target is changed according to an operation mode of a user.

FIG. 29 illustrates an example of processing executed by the camera control unit 16 in order to adjust, to the operation mode of the user, the time and speed (focus moving speed) until focusing. Note that processes similar to those in FIG. 23 are denoted by the same reference numerals, and description thereof is omitted as appropriate.

The camera control unit 16 determines whether or not the specific operation has been detected in step S101, and in a case where it is determined that the specific operation has been detected, the camera control unit 16 performs processing of transitioning to the temporary MF mode in step S103, and acquires information on the specific operation of the user in step S111.

In the information acquired in step S111, not only the moving direction and the moving distance of the focus position but also the moving speed of the focus position are acquired in response to that the user has performed an operation of moving the focus position in the optical axis direction as the specific operation.

In step S105, the camera control unit 16 determines whether or not the end of the specific operation has been detected. The camera control unit 16 repeats the process of step S111 until the end of the specific operation is detected.

On the other hand, in a case where it is determined that the end of the specific operation has been detected, the camera control unit 16 proceeds to step S106 and performs processing of transitioning to the mode before transitioning to the MF mode.

The camera control unit 16 acquires information in the focus control target area FA in step S107, and selects a new focus control target in step S108.

Then, the camera control unit 16 returns to step S101, determines again whether or not the specific operation has been detected, and in a case where the specific operation has not been detected, control according to the current mode is executed in step S112. At this time, in a case where the moving speed of the focus position has been acquired in step S111, the camera control unit 16 performs focus control according to the mode while taking the moving speed into consideration in step S112.

Thus, control for focusing on the subject as the focus control target newly selected in step S108 at a speed corresponding to the operation mode of the user is performed.

Note that the focus moving speed can be set in advance by a menu operation, in addition to the changing according to the specific operation of the user as described above. For example, it may be configured such that a setting to increase the focus speed, a setting to decrease the focus speed, and a setting that it is variable according to the specific operation of the user can be selected.

7. APPLICATION EXAMPLE

The technology according to the present disclosure can be applied to a medical imaging system. The medical imaging system is a medical system using an imaging technology, and is, for example, an endoscope system or a microscope system.

[Endoscope System]

Figure 30:
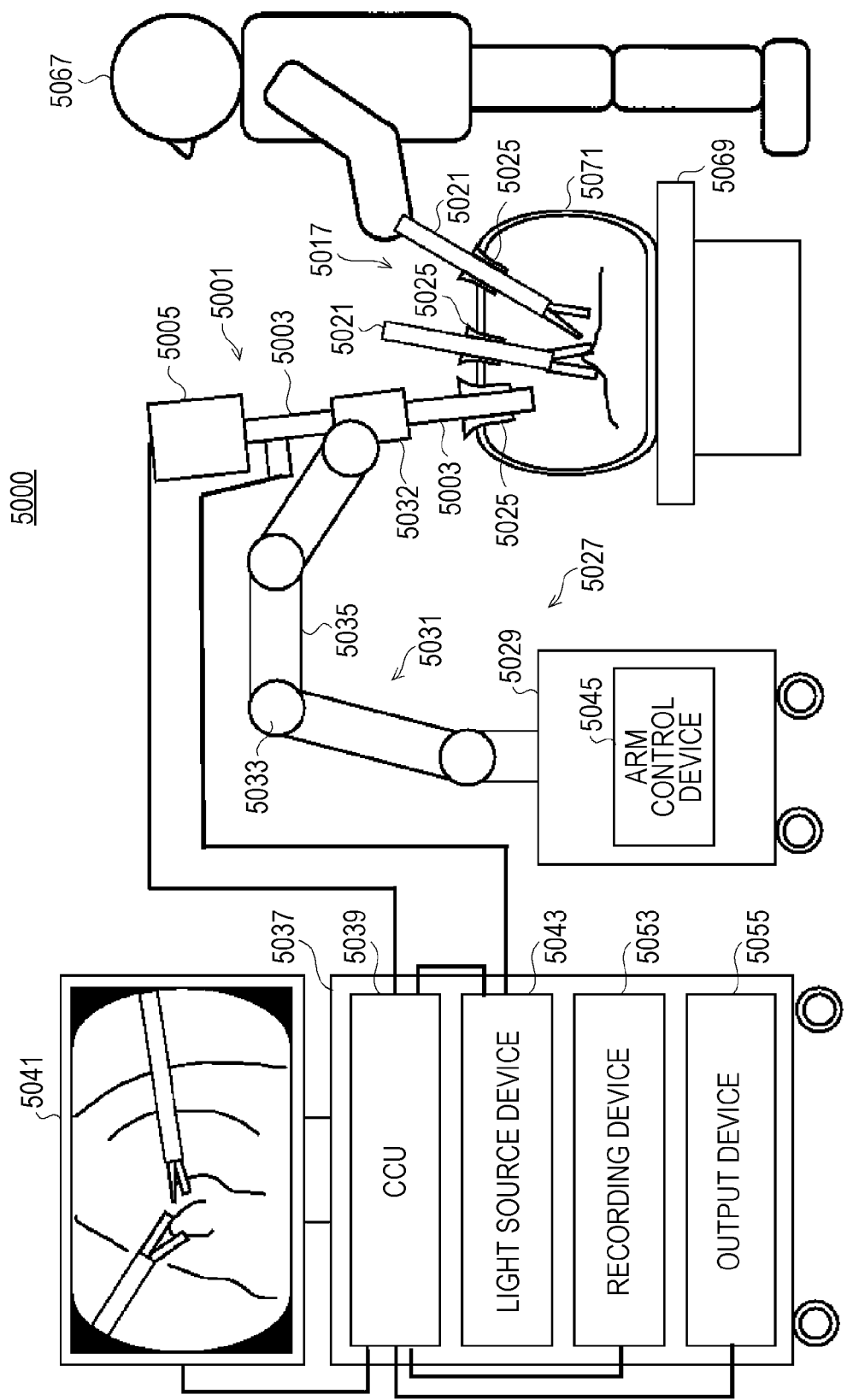
FIG. 30 is a diagram illustrating an example of a schematic configuration of an endoscope system.
Figure 31:
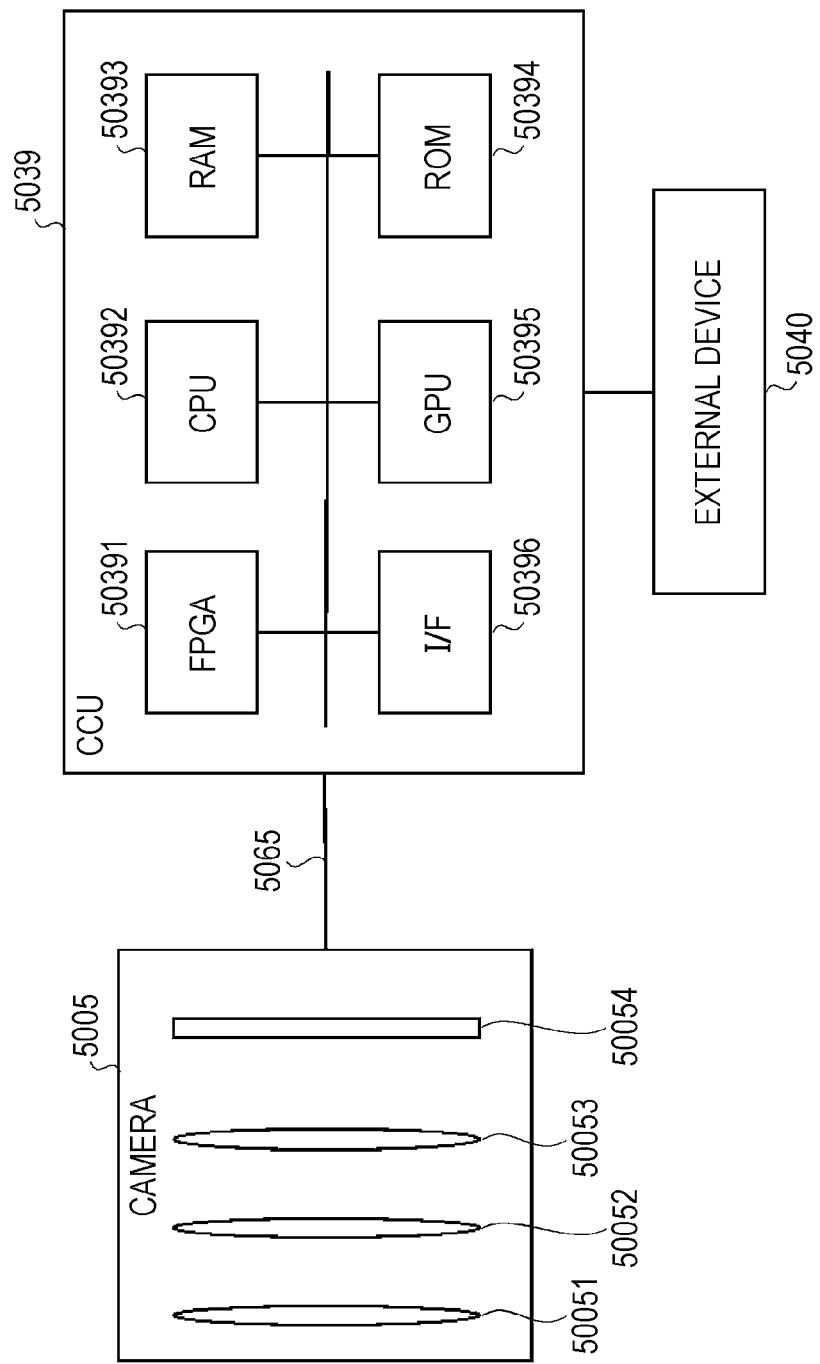
FIG. 31 is a block diagram illustrating an example of functional configurations of a camera head and a CCU illustrated in FIG. 30.

An example of the endoscope system will be described with reference to FIGS. 30 and 31. FIG. 30 is a diagram illustrating an example of a schematic configuration of an endoscope system 5000 to which the technology according to the present disclosure can be applied. FIG. 31 is a diagram illustrating an example of a configuration of an endoscope 5001 and a camera control unit (CCU) 5039. FIG. 30 illustrates a state in which an operator (for example, a surgeon) 5067 who is a surgery participant is performing surgery on a patient 5071 on a patient bed 5069 using an endoscope system 5000. As illustrated in FIG. 30, the endoscope system 5000 includes an endoscope 5001 that is a medical imaging apparatus, the CCU 5039, a light source device 5043, a recording device 5053, an output device 5055, and a support apparatus 5027 that supports the endoscope 5001.

In endoscopic surgery, an insertion aid called a trocar 5025 punctures the patient 5071. Then, a scope 5003 and a surgical instrument 5021 connected to the endoscope 5001 are inserted into the body of the patient 5071 via the trocar 5025. The surgical instrument 5021 is, for example, an energy device such as an electric scalpel, forceps, or the like.

A surgical image that is a medical image showing the inside of the body of the patient 5071 captured by the endoscope 5001 is displayed on a display device 5041. The operator 5067 performs treatment on an operation target using the surgical instrument 5021 while viewing the surgical image displayed on the display device 5041. Note that the medical image is not limited to the surgical image, and may be a diagnostic image captured during diagnosis.

[Endoscope]

The endoscope 5001 is a camera that images the inside of the body of the patient 5071, and is, for example, as illustrated in FIG. 31, a camera head including a condensing optical system 50051 that condenses incident light, a zoom optical system 50052 that enables optical zooming by changing the focal length of the camera, a focus optical system 50053 that enables focus adjustment by changing the focal length of the camera, and a light receiving element 50054. The endoscope 5001 condenses light on the light receiving element 50054 via the connected scope 5003 to generate a pixel signal, and outputs the pixel signal to the CCU 5039 through the transmission system. Note that the scope 5003 is an insertion unit that has an objective lens at a distal end and guides light from the connected light source device 5043 into the body of the patient 5071. The scope 5003 is, for example, a rigid scope for a rigid endoscope and a flexible scope for a flexible endoscope. Furthermore, the pixel signal is only required to be a signal based on a signal output from a pixel, and is, for example, a RAW signal or an image signal. In addition, a memory may be mounted in the transmission system that connects the endoscope 5001 and the CCU 5039, and parameters related to the endoscope 5001 and the CCU 5039 may be stored in the memory. The memory may be disposed, for example, on a connection portion of the transmission system or on a cable. For example, parameters at the time of shipment of the endoscope 5001 and parameters that have changed at the time of energization may be stored in the memory of the transmission system, and the operation of the endoscope may be changed on the basis of the parameters read from the memory. In addition, the endoscope and the transmission system may be in a set and referred to as an endoscope. The light receiving element 50054 is a sensor that converts received light into a pixel signal, and is, for example, a complementary metal oxide semiconductor (CMOS) type imaging element. The light receiving element 50054 is preferably an imaging element capable of color image capturing having a Bayer array. Furthermore, the light receiving element 50054 is preferably an imaging element having the number of pixels corresponding to a resolution of, for example, 4K (the number of horizontal pixels of 3840×the number of vertical pixels of 2160), 8K (the number of horizontal pixels of 7680×the number of vertical pixels of 4320), or a square 4K (the number of horizontal pixels of 3840 or more×the number of vertical pixels of 3840 or more). The light receiving element 50054 may be one sensor chip or a plurality of sensor chips. For example, a prism that separates incident light for each predetermined wavelength band may be provided, and each wavelength band may be imaged by different light receiving elements. In addition, a plurality of light receiving elements may be provided for stereoscopic viewing. In addition, the light receiving element 50054 may be a sensor including an arithmetic processing circuit for image processing in a chip structure, or may be a sensor for time of flight (ToF). Note that the transmission system is, for example, an optical fiber cable or wireless transmission. The wireless transmission is only required to be capable of transmitting the pixel signal generated by the endoscope 5001. For example, the endoscope 5001 and the CCU 5039 may be wirelessly connected or the endoscope 5001 and the CCU 5039 may be connected via a base station in an operating room. At this time, the endoscope 5001 may simultaneously transmit not only the pixel signal but also information (for example, the processing priority of the pixel signal, the synchronization signal, and the like) related to the pixel signal. Note that, in the endoscope, the scope and the camera head may be integrated, or a light receiving element may be provided at the distal end portion of the scope.

[Camera Control Unit (CCU)]

The CCU 5039 is a control device that integrally controls the connected endoscope 5001 and light source device 5043, and is, for example, an information processing device including an FPGA 50391, a CPU 50392, a RAM 50393, a ROM 50394, a GPU 50395, and an I/F 50396 as illustrated in FIG. 31. In addition, the CCU 5039 may integrally control the connected display device 5041, recording device 5053, and output device 5055. For example, the CCU 5039 controls the irradiation timing, the irradiation intensity, and the type of an irradiation light source of the light source device 5043. Furthermore, the CCU 5039 performs image processing such as development processing (for example, demosaic processing) or correction processing on the pixel signal output from the endoscope 5001, and outputs a pixel signal after processing (for example, an image) to an external device such as the display device 5041. Furthermore, the CCU 5039 transmits a control signal to the endoscope 5001 to control driving of the endoscope 5001. The control signal is, for example, information regarding imaging conditions such as a magnification and a focal length of the camera. Note that the CCU 5039 may have a function for image down-conversion, and may be capable of simultaneously outputting a high resolution (for example, 4K) image to the display device 5041 and a low resolution (for example, HD) image to the recording device 5053.

In addition, the CCU 5039 may be connected to an external device via an IP converter that converts a signal into a predetermined communication protocol (for example, Internet Protocol (IP)). The connection between the IP converter and the external device may be configured by a wired network, or a part or all of the networks may be constructed by a wireless network. For example, the IP converter on the CCU 5039 side may have a wireless communication function and transmit a received video to an IP switcher or an output-side IP converter via a wireless communication network such as a 5th generation mobile communication system (5G) or a 6th generation mobile communication system (6G).

[Light Source Device]

The light source device 5043 is a device capable of emitting light in a predetermined wavelength band, and includes, for example, a plurality of light sources and a light source optical system that guides light of the plurality of light sources. The light source is, for example, a xenon lamp, an LED light source, or an LD light source. The light source device 5043 has, for example, LED light sources corresponding to three respective primary colors R, G, and B, and emits white light by controlling output intensity and output timing of each light source. In addition, the light source device 5043 may have a light source capable of emitting special light used for special light observation, separately from a light source that emits normal light used for normal light observation. The special light is light in a predetermined wavelength band different from that of normal light which is light for normal light observation, and examples thereof include near-infrared light (light having a wavelength of 760 nm or more), infrared light, blue light, and ultraviolet light. The normal light is, for example, white light or green light. In narrow band light observation which is a type of special light observation, blue light and green light are alternately emitted, whereby an image of a predetermined tissue such as a blood vessel in a mucosal surface layer can be captured with high contrast by utilizing wavelength dependency of light absorption in a body tissue. Furthermore, in fluorescence observation which is a type of special light observation, excitation light that excites a reagent injected into a body tissue is emitted, and fluorescence emitted from the body tissue or the reagent is received to obtain a fluorescence image, so that it is possible to make it easy for the operator to visually recognize the body tissue or the like that is difficult for the operator to visually recognize with the normal light. For example, in infrared light observation using infrared light, by emitting near infrared light as excitation light for exciting a reagent such as indocyanine green (ICG) injected into a body tissue, a deep structure of the body tissue can be easily visually recognized. In addition, in the fluorescence observation, a reagent (for example, PDD or 5-ALA) that is excited by special light in a blue wavelength band and emits fluorescence in a red wavelength band may be used. Note that, in the light source device 5043, the type of irradiation light is set by control of the CCU 5039. The CCU 5039 may have a mode in which the normal light observation and the special light observation are alternately performed by controlling the light source device 5043 and the endoscope 5001. At this time, information based on the pixel signal obtained by the special light observation is preferably superimposed on the pixel signal obtained by the normal light observation.

[Recording Device]

The recording device 5053 is a device that records the pixels acquired from the CCU 5039, and is, for example, a recorder. The recording device 5053 records the image acquired from the CCU 5039 in an HDD, an SDD, or an optical disk. The recording device 5053 may be connected to a network in the hospital and accessible from a device outside the operating room. In addition, the storage device 5053 may have a function for image down-conversion or a function for image up-conversion.

[Display Device]

The display device 5041 is a device capable of displaying an image, and is, for example, a display monitor. The display device 5041 displays a display image based on the pixel signal subjected to the image processing by the CCU 5039 under the control of the CCU 5039. Note that the display device 5041 may also function as an input device that enables line-of-sight recognition, voice recognition, and instruction input by a gesture by including a camera and a microphone.

[Output Device]

The output device 5055 is a device that outputs information acquired from the CCU 5039, and is, for example, a printer. The output device 5055 prints, for example, a print image on paper based on the pixel signal acquired from the CCU 5039.

[Support Apparatus]

The support apparatus 5027 is an articulated arm including a base unit 5029 having an arm control device 5045, an arm unit 5031 extending from the base unit 5029, and a holding unit 5032 attached to a distal end of the arm unit 5031. The arm control device 5045 includes a processor such as a CPU, and operates according to a predetermined program to control driving of the arm unit 5031. The support apparatus 5027 controls the position and posture of the endoscope 5001 held by the holding unit 5032, for example, by controlling parameters such as the length of each link 5035 constituting the arm unit 5031 and the rotation angle and torque of each joint 5033 by the arm control device 5045. Thus, the endoscope 5001 can be changed to a desired position or posture, the scope 5003 can be inserted into the patient 5071, and the observation area in the body can be changed. The support apparatus 5027 functions as an endoscope support arm that supports the endoscope 5001 during surgery. Thus, the support apparatus 5027 can serve as a substitute for a scopist who is an assistant holding the endoscope 5001. In addition, the support apparatus 5027 may be a device that supports a microscope device 5301 to be described later, and can also be referred to as a medical support arm. Note that the control of the support apparatus 5027 may be an autonomous control method by the arm control device 5045, or may be a control method controlled by the arm control device 5045 on the basis of a user input. For example, the control method may be a master slave method in which the support apparatus 5027 as the slave device is controlled on the basis of the movement of the master device at hand of the user. In addition, the support apparatus 5027 may be remotely controllable from outside the operating room.

An example of the endoscope system 5000 to which the technology according to the present disclosure can be applied has been described above. For example, the technology according to the present disclosure may be applied to a microscope system.

[Microscope System]

Figure 32:
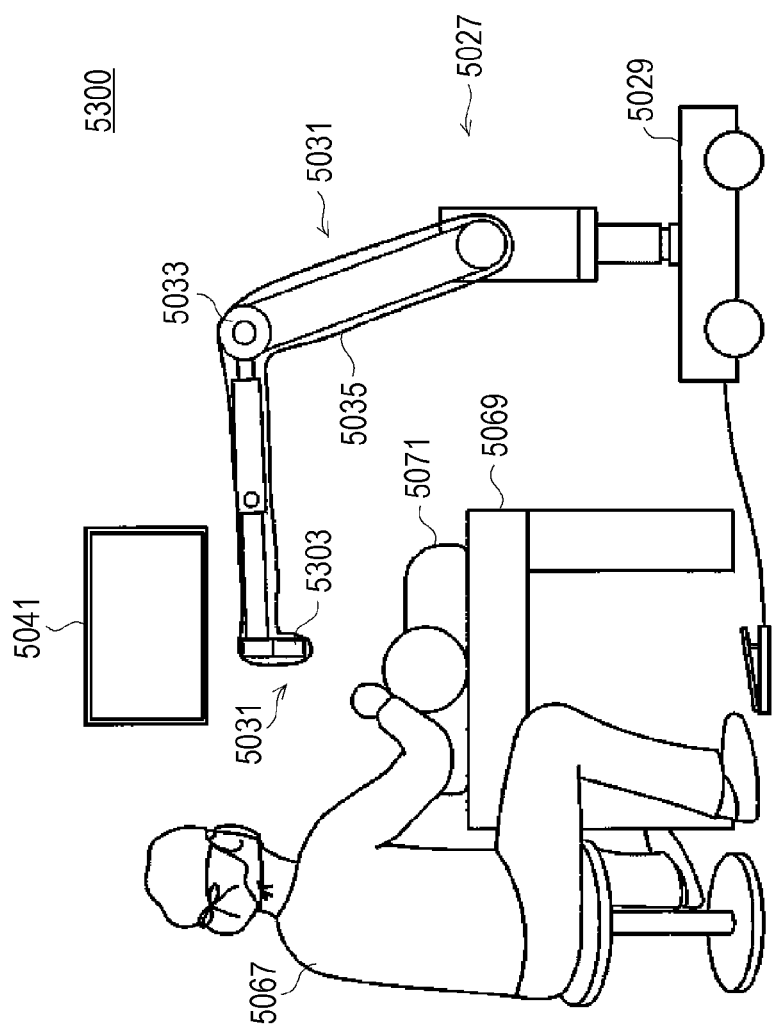
FIG. 32 is a diagram illustrating an example of a schematic configuration of a microscopic surgery system.

FIG. 32 is a diagram illustrating an example of a schematic configuration of a microscopic surgery system to which the technology according to the present disclosure can be applied. Note that, in the following description, components similar to those of the endoscope system 5000 are denoted by the same reference numerals, and redundant description thereof will be omitted.

FIG. 32 schematically illustrates a state in which the operator 5067 is performing surgery on the patient 5071 on the patient bed 5069 using a microscopic surgery system 5300. Note that, in FIG. 32, for the sake of simplicity, a cart 5037 is not illustrated in the configuration of the microscopic surgery system 5300, and the microscope device 5301 in place of the endoscope 5001 is illustrated in a simplified manner. However, the microscope device 5301 in the present description may refer to a microscope unit 5303 provided at the distal end of the link 5035, or may refer to the entire configuration including the microscope unit 5303 and the support apparatus 5027.

As illustrated in FIG. 32, at the time of surgery, an image of a surgical site captured by the microscope device 5301 is enlarged and displayed on the display device 5041 installed in the operating room using the microscopic surgery system 5300. The display device 5041 is installed at a position facing the operator 5067, and the operator 5067 performs various treatments on the surgical site such as resection of an affected part, for example, while observing the state of the surgical site by a video projected on the display device 5041.

Examples of the endoscope system 5000 and the microscopic surgery system 5300 to which the technology according to the present disclosure can be applied have each been described above. Note that the system to which the technology according to the present disclosure can be applied is not limited to such an example. For example, the support apparatus 5027 can support another observation device or another surgical instrument at the distal end thereof instead of the endoscope 5001 or the microscope unit 5303. As the other observation device, for example, forceps, tweezers, a pneumoperitoneum tube for pneumoperitoneum, an energy treatment tool for incising a tissue or sealing a blood vessel by cauterization, or the like can be applied. By supporting these observation devices and surgical instruments by the support apparatus, the position can be more stably fixed and the burden on the medical staff can be reduced as compared with a case where the medical staff manually supports them. The technology according to the present disclosure may be applied to a support apparatus that supports such a configuration other than the microscope unit.

The technology according to the present disclosure can be suitably applied to the endoscope system 5000, the microscope device 5301, and the like among the configurations described above. Specifically, the subject intended by the operator is estimated according to the moving direction and the moving distance of the focus position, and is selected as the focus control target. Thus, the focus position can be quickly and accurately adjusted as compared with a case where the focus position can be manually adjusted to the focus control target, and therefore, the operation time can be shortened and the efficiency can be improved, and the burden on the patient can be reduced.

8. SUMMARY

As described above, the imaging device 1 includes the user operation detection unit 31 that detects an operation of a user (for example, a rotation operation on the focus ring 7) for focus control, the focus position movement detection unit 32 that detects movement (change) of a focus position (a position in the optical axis direction of a subject in focus) based on the operation of the user detected by the user operation detection unit 31, the depth information detection unit 33 that detects depth information in the focus control target area FA, and the focus control unit 38 that sets a target focus position on the basis of the movement of the focus position and the depth information.

That is, a change in the focus position due to a user operation is detected, and setting of the target focus position reflecting the user operation and focus control are performed after the user operation.

For example, in a case where the user operation is performed in the AF mode, a transition to the MF mode is temporarily made to detect the movement of the focus position by the user. This detection processing is processing for estimating the focus control target (subject) intended by the user, and is also processing for collecting information for selecting a subject as the focus control target in the subsequent AF control.

The camera control unit 16 of the imaging device 1 can perform optimum focus control using the MF mode and the AF mode by detecting manual operation of the focus ring 7 by the user, estimating the user's intention by detecting an operation direction (moving direction of the focus position)

and the operation amount (moving amount of the focus position), and performing focus control based on the estimation after shifting to the AF mode.

Furthermore, in a case where only the AF mode is used, there are many scenes where a subject different from the subject intended by the user is in focus. By using the imaging device 1 having the present configuration, it is possible to specify the subject intended by the user via the temporary MF mode during execution of the AF mode, and thus, it is possible to achieve desired AF control. In particular, the AF mode and the MF mode can be seamlessly switched, and then such highly convenient control can be achieved by using information acquired in a certain mode also in another mode to which it is shifting.

Note that, in each of the above-described examples, the description has been given focusing on the operation of rotating the focus ring 7 as the focus operation, but as described above, even in a case where the focus operation is performed by the remote operation by the external operation device, the same processing can be performed, and as a result, a similar effect can be obtained.

In this case, usability in remote operation can be improved. In particular, it is suitable in a case where the subject intended by the user is brought into focus by remote operation with respect to the fixedly arranged imaging device 1, and since it is not necessary to touch the imaging device 1, occurrence of blurring at the time of the focus operation can be eliminated.

In other words, the configuration of the imaging device 1 as described above includes the user operation detection unit 31 that detects the user operation for the focus control, the focus position movement detection unit 32 that detects the movement of the focus position by the user operation detected by the user operation detection unit 31, the depth information detection unit 33 that detects the depth information in the focus control target area FA of the focus control, and the focus control unit 38 that sets the target focus position on the basis of the depth information in a case where the user operation detection unit 31 detects the end of the movement of the focus position.

As described in the section (FIGS. 4, 8, 11, and 14) of the functional configuration of the imaging device 1, and the like, the focus position movement detection unit 32 in the imaging device 1 may detect the moving direction of the focus position.

The user's intention can be more accurately estimated by detecting the moving direction of the focus position. Therefore, user-friendly autofocus control can be achieved.

As described in the section (FIG. 4) of the functional configuration of the imaging device 1, and the like, the focus position movement detection unit 32 of the imaging device 1 may detect the moving direction every predetermined time (for example, one frame).

By detecting the moving direction every predetermined time, the operation direction of the user is appropriately detected.

Therefore, it is possible to appropriately estimate the focus control target intended by the user.

As described in the section (FIGS. 4, 8, and 9) of the functional configuration of the imaging device 1, and the like, the depth information detection unit 33 of the imaging device 1 may detect the depth information of the entirety of the focus control target area FA, and the focus control unit 38 may set the target focus position on the basis of the depth information of the entirety of the focus control target area FA, the moving direction of the focus position, and an end time focus position (focus position at the movement end time point) at the time of detecting that an operation of the user on the movement of the focus position has ended.

By setting the target focus position on the basis of the end time focus position, the user's intention is reflected in the focus control.

Furthermore, even in a case where the mode is changed so as to return to the tracking focus mode again after the transition from the tracking focus mode to the temporary MF mode, the information of the user operation acquired in the MF mode is used in the tracking focus mode, whereby the tracking focus control in accordance with the user's intention can be performed.

As described in the section of the functional configuration of the imaging device 1 (FIG. 5), and the like, the imaging device 1 may include the in-screen target position setting unit 34 that sets the in-screen target position PS on the basis of the depth information, and the focus control unit 38 may set the focus position corresponding to the in-screen target position PS as the target focus position.

The in-screen target position PS is an area set on the captured image, and is an area including a group of pixels having similar depth information. For example, depth information for each pixel is similar in a pixel area in which a certain subject is captured, and thus the pixel area is set as the in-screen target position PS.

Thus, it is possible to perform appropriate focus control on the subject recognized on the basis of the depth information.

In other words, such a configuration of the imaging device 1 includes an area setting unit (in-screen target position setting unit 34) that sets an area where a focus possible object is located in an image as a focus possible area (in-screen target position) on the basis of the depth information, and the focus control unit 38 sets the target focus position so as to focus on the focus possible object in the focus possible area set by the area setting unit.

As described in the first selection example (FIGS. 7 to 10, and 26) and the like, in a case where the in-screen target position setting unit 34 sets a plurality of in-screen target positions PS, the focus control unit 38 of the imaging device 1 may set, as the target focus position, a focus position closest to the end time focus position among focus positions corresponding to the in-screen target positions PS.

Thus, in a case where the user moves the focus position to the vicinity of the target subject, the focus control for the target subject is performed.

That is, the user can perform the autofocus control on an intended subject without moving the focus ring 7 so that the target subject is accurately focused, and convenience can be improved.

In other words, in such a configuration of the imaging device 1, in a case where the area setting unit (in-screen target position setting unit 34) sets a plurality of focus possible areas (in-screen target positions), the focus control unit 38 sets the target focus position so as to focus on the focus possible object at the position closest to the end time focus position in the optical axis direction.

As described in the first selection example and the second example (FIG. 25) of the information acquisition processing in the focus control target area FA, and the like, the imaging device 1 may include the subject recognition unit 35 that recognizes the subject, and in a case of determining that the in-screen target position PS matches an in-screen subject position that is a position of the subject in a screen recognized by the subject recognition unit 35, the focus control unit 38 may set a focus position corresponding to the in-screen subject position as the target focus position.

Thus, for example, a subject as a focus control target is selected using image recognition processing or the like.

Therefore, a possibility that an appropriate subject is selected as the focus control target can be increased, and appropriate focus control can be executed.

In particular, in a case where a category such as a person, a cat, or a car is specified as a subject to be detected, an appropriate subject belonging to the specified subject category is a possible focus control target, and thus, it is possible to reduce the possibility of focusing on an unintended subject.

In other words, such a configuration of the imaging device 1 includes the subject recognition unit 35 that recognizes the subject on the basis of the captured image, and the focus control unit 38 sets the target focus position so as to focus on the focus possible object in the focus possible area (in-screen target position) that matches the position of the subject in the image.

As described in the first selection example and the like, in a case where the subject recognition unit 35 recognizes a plurality of subjects, the focus control unit 38 of the imaging device 1 may set, as the target focus position, a focus position closest to the end time focus position among focus positions corresponding to the in-screen subject positions.

Thus, an appropriate subject can be selected as the focus control target, and a subject for which the user's intention has been determined can be selected as the focus control target.

In other words, in such a configuration of the imaging device 1, in a case where the subject recognition unit 35 recognizes a plurality of subjects, the focus control unit 38 sets the target focus position so as to focus on the subject at the position closest to the end time focus position in the optical axis direction.

As described in the section of the functional configuration of the imaging device 1 (FIG. 4), FIGS. 20 to 22, and the like, the focus control unit 38 of the imaging device 1 may perform tracking focus control for the subject focused according to the target focus position set after an end of the movement of the focus position.

Thus, the user does not need to perform an operation of continuing focusing on the subject that has been manually focused. This can be achieved by selecting the focus control target in the tracking focus mode in consideration of content of the operation of the user on the focus ring 7.

By performing such control, convenience can be improved.

As described in the section (FIGS. 4, 7, 12, and 13) of the functional configuration of the imaging device 1 and the like, the imaging device 1 may include the area setting unit 36 that sets the focus control target area FA according to an operation of a user.

Thus, it is possible to select the focus control target by further reflecting the user's intention from among the subjects.

Therefore, focus control appropriate for the user can be executed.

As described in the section (FIGS. 4, 6, 7, 10, 12, 13, and 16 to 18) of the functional configuration of the imaging device 1, and the like, the imaging device 1 may include the display control unit 39 that performs processing of superimposing and displaying the first frame image FP1 on a subject focused by the focus control unit 38 among the subjects recognized by the subject recognition unit 35, and processing of superimposing and displaying the second frame image FP2 on other subjects.

Thus, the user can confirm the focus control target by confirming the display unit 13.

Therefore, convenience can be improved.

As described in the section of focus moving speed control (FIG. 29), the focus control unit 38 of the imaging device 1 may perform the focus control according to a set focus moving speed.

Thus, the speed (time) until focusing in the focus control can be specified only by changing the operation mode.

Therefore, preferred autofocus control can be achieved by a simple operation, and the convenience of the user is improved.

As described in the section (FIG. 3) of the configuration of the imaging device 1, and the like, the user operation detection unit 31 of the imaging device 1 may detect an operation of the user on the focus ring 7, and the focus position movement detection unit 32 may detect the moving direction of the focus position on the basis of the operation direction of the focus ring 7.

Thus, the moving direction of the focus position is appropriately detected.

Therefore, appropriate focus control can be performed on the basis of the operation of the user on the focus ring 7.

As described in the section of the functional configuration of the imaging device 1 (FIG. 4), and the like, the focus control unit 38 of the imaging device 1 is capable of switching between a first mode (AF mode) in which autofocus control on a subject is performed and a second mode (MF mode) in which manual focus control is performed, and may switch to the second mode in a case where the user operation detection unit 31 detects an operation on the focus ring 7 in the first mode.

Thus, the user only needs to operate the focus ring 7 when switching to the MF mode.

That is, since mode switching can be performed by a simple operation, convenience can be improved.

As described in the section of the functional configuration of the imaging device 1 (FIG. 4), and the like, the user operation detection unit 31 of the imaging device 1 may determine that an end of the movement of the focus position is detected in a case where a state in which the operation on the focus ring 7 is detected as the user operation changes to a state in which the operation is not detected.

Thus, for example, it is possible to detect the end of the user operation on the focus ring 7 using a sensor or the like.

Therefore, the user operation end time point can be appropriately determined, and the subsequent focus control can be appropriately performed.

As described in the fourth example (FIG. 28) of the processing of selecting the focus control target, and the like, the focus control unit 38 of the imaging device 1 is capable of executing a first control (selection mode illustrated in the first selection example) of setting a focus position closest to the end time focus position among focus positions corresponding to the in-screen target position PS as the target focus position, and a second control (selection mode illustrated in the second selection example) of setting the target focus position according to the focus position and the moving direction at the end time point of the movement, and may switch from the first control to the second control in a case where a deviation between the closest focus position and the end time focus position is equal to or more than a predetermined threshold.

Thus, the subject of the focus control target is selected according to the operation mode of the user and the position of the subject.

Therefore, the focus control can be performed on the subject of the focus control target in which the user's intention is appropriately reflected.

In other words, such a configuration of the imaging device 1 includes an area setting unit (in-screen target position setting unit 34) that sets an area in which a focus possible object is located in an image as a focus possible area (in-screen target position) on the basis of depth information, the focus position movement detection unit 32 detects a moving direction of the focus position, the focus control unit 38 is capable of executing first control of setting the target focus position so as to focus on the focus possible object at a position closest to the focus position (end time focus position) at the end time point of movement in the optical axis direction and second control of setting the target focus position according to the focus position at the end time point of movement and the moving direction, and switches from the first control to the second control in a case where the deviation between the target focus position and the focus position at the end time point of movement in the first control is equal to or more than a predetermined threshold.

Furthermore, the program to be executed by the imaging device 1 is a program to be executed by a CPU, a DSP, or the like, or a device including the CPU, the DSP, or the like, for example, to execute each processing illustrated in each of FIGS. 23 to 29.

That is, this program is a program for causing the imaging device 1 or the like to execute processing of detecting an operation of a user for focus control, processing of detecting movement of a focus position based on the operation of the user detected, processing of detecting depth information in the focus control target area FA, and processing of setting a target focus position on the basis of the movement of the focus position and the depth information.

With such a program, the above-described imaging device 1 can be achieved.

A program for achieving such an imaging device 1 can be recorded in advance in an HDD as a recording medium built in a device such as the imaging device 1, a ROM in a microcomputer having a CPU, or the like.

Alternatively, the program can also be temporarily (or permanently) stored (recorded) in a removable recording medium such as a flexible disc, a compact disc read only memory (CD-ROM), a magnet optical (MO) disc, a digital versatile disc (DVD), a Blu-ray disc (registered trademark), a magnetic disc, a semiconductor memory, or a memory card. Such a removable recording medium can be provided as what is called package software.

Furthermore, such a program can be installed from the removable recording medium into a personal computer or the like, or can be downloaded from a download site via a network such as a local area network (LAN) or the Internet.

Furthermore, such a program is suitable for providing the imaging device 1 of the embodiment in a wide range. For example, by downloading the program to a mobile terminal device such as a smartphone or a tablet having a camera function, a mobile phone, a personal computer, a game device, a video device, a personal digital assistant (PDA), or the like, these devices can be caused to function as the imaging device 1 of the present disclosure.

Note that effects described in the present description are merely examples and are not limited, and other effects may be provided.

9. PRESENT TECHNOLOGY

The present technology can employ configurations as follows.

(1)

An imaging device, including:
   a user operation detection unit that detects an operation of a user for focus control;
   a focus position movement detection unit that detects movement of a focus position based on the operation of the user detected by the user operation detection unit;
   a depth information detection unit that detects depth information in a focus control target area; and
   a focus control unit that sets a target focus position on the basis of the movement of the focus position and the depth information.

(2)

The imaging device according to (1) above, in which
   the focus position movement detection unit detects a moving direction of the focus position.

(3)

The imaging device according to (2) above, in which
   the focus position movement detection unit detects the moving direction every predetermined time.

(4)

The imaging device according to (2) or (3) above, in which
   the depth information detection unit detects depth information of an entirety of the focus control target area, and
   the focus control unit sets the target focus position on the basis of the depth information of the entirety of the focus control target area, the moving direction of the focus position, and an end time focus position at a time of detecting that an operation of the user with respect to the movement of the focus position has ended.

(5)

The imaging device according to (4) above, further including
   an in-screen target position setting unit that sets an in-screen target position on the basis of the depth information, in which
   the focus control unit sets a focus position corresponding to the in-screen target position as the target focus position.

(6)

The imaging device according to (5) above, in which
   in a case where the in-screen target position setting unit sets a plurality of the in-screen target positions, the focus control unit sets, as the target focus position, a focus position closest to the end time focus position among focus positions corresponding to the in-screen target positions.

(7)

The imaging device according to (5) or (6) above, further including
   a subject recognition unit that recognizes a subject, in which
   in a case of determining that the in-screen target position matches an in-screen subject position that is a position of the subject in a screen recognized by the subject recognition unit, the focus control unit sets a focus position corresponding to the in-screen subject position as the target focus position.

(8)
The imaging device according to (7) above, in which
in a case where the subject recognition unit has recognized a plurality of the subjects, the focus control unit sets, as the target focus position, a focus position closest to the end time focus position among focus positions corresponding to the in-screen subject position.

(9)
The imaging device according to (7) or (8) above, in which
the focus control unit performs tracking focus control for the subject focused according to the target focus position set after an end of the movement of the focus position.

(10)
The imaging device according to any one of (1) to (9) above, further including
an area setting unit that sets the focus control target area according to an operation of a user.

(11)
The imaging device according to any one of (7) to (9) above, further including
a display control unit that performs processing of superimposing and displaying a first frame image on a subject focused by the focus control unit among the subjects recognized by the subject recognition unit, and processing of superimposing and displaying a second frame image on other subjects.

(12)
The imaging device according to any one of (1) to (11) above, in which
the focus control unit performs focus control according to a set focus moving speed.

(13)
The imaging device according to any one of (2) to (9) above, in which
the user operation detection unit detects an operation of a user on a focus ring, and
the focus position movement detection unit detects the moving direction of the focus position on the basis of an operation direction of the focus ring.

(14)
The imaging device according to any one of (2) to (9) above, in which
the user operation detection unit detects a focus operation of the user by receiving operation information transmitted from an external operation device, and
the focus position movement detection unit detects the moving direction of the focus position on the basis of an operation direction of the focus operation.

(15)
The imaging device according to (13) or (14) above, in which
the focus control unit
is capable of switching between a first mode in which autofocus control on a subject is performed and a second mode in which manual focus control is performed, and
switches to the second mode in a case where the user operation detection unit detects an operation on the focus ring in the first mode.

(16)
The imaging device according to any one of (13) to (15) above, in which
the user operation detection unit determines that an end of the movement of the focus position is detected in a case where a state in which an operation on the focus ring is detected as the operation of the user is changed to a state in which the operation is not detected.

(17)
The imaging device according to any one of (5) to (9) above, in which
the focus control unit
is capable of executing a first control of setting a focus position closest to the end time focus position among focus positions corresponding to the in-screen target position as the target focus position, and a second control of setting the target focus position according to the focus position and the moving direction at an end time point of the movement, and
switches from the first control to the second control in a case where a deviation between the closest focus position and the end time focus position is equal to or more than a predetermined threshold.

(18)
A focus position setting method, including:
detecting an operation of a user for focus control;
detecting movement of a focus position based on the operation of the user detected;
detecting depth information in a focus control target area; and
setting a target focus position on the basis of the movement of the focus position and the depth information.

(19)
A program for causing an imaging device to execute:
processing of detecting an operation of a user for focus control;
processing of detecting movement of a focus position based on the operation of the user detected;
processing of detecting depth information in a focus control target area; and
processing of setting a target focus position on the basis of the movement of the focus position and the depth information.

REFERENCE SIGNS LIST

1 Imaging device
7 Focus ring
31 User operation detection unit
32 Focus position movement detection unit
33 Depth information detection unit
34 In-screen target position setting unit
35 Subject recognition unit
36 Area setting unit
38 Focus control unit
PS, PS1, PS2, PS3, PS4, PS5, PS6, PS7 In-screen target position
PO In-screen subject position
FP1 First frame image
FP2 Second frame image

The invention claimed is:
1. An imaging device, comprising:
a user operation detection unit configured to determine an operation of a user for focus control;
a focus position movement detection unit configured to determine movement of a focus position based on the operation of the user detected by the user operation detection unit;
a depth information detection unit configured to determine depth information in a focus control target area;

an in-screen target position setting unit configured to set each of a plurality of in-screen target positions based on the depth information; and a focus control unit configured to:
- set a target focus position based on the movement of the focus position, the determined depth information, and an end time focus position at a time of determination that an operation of the user with respect to the movement of the focus position has ended; and
- set, based on a determination that the plurality of in-screen target positions is set, a focus position closest to the end time focus position among focus positions corresponding to the plurality of in-screen target positions as the target focus position.

2. The imaging device according to claim 1, wherein the focus position movement detection unit is further configured to determine a moving direction of the focus position.

3. The imaging device according to claim 2, wherein the focus position movement detection unit is further configured to determine the moving direction every specific time.

4. The imaging device according to claim 2, wherein the depth information detection unit is further configured to determine depth information of an entirety of the focus control target area; and
the focus control unit is further configured to set the target focus position based on the depth information of the entirety of the focus control target area and the moving direction of the focus position at the time of determination that the operation of the user with respect to the movement of the focus position has ended.

5. The imaging device according to claim 4, wherein the focus control unit is further configured to set a focus position corresponding to an in-screen target position of the plurality of in-screen target positions as the target focus position.

6. The imaging device according to claim 5, further comprising:
- a subject recognition unit configured to recognize a subject; and,
- the focus control unit is further configured to set a focus position corresponding to an in-screen subject position as the target focus position based on a determination that the in-screen target position of the plurality of in-screen target positions matches an in-screen subject position that is a position of the subject in a screen recognized by the subject recognition unit.

7. The imaging device according to claim 6, wherein the focus control unit is further configured to set as the target focus position, a focus position closest to the end time focus position among focus positions corresponding to the in-screen subject position based on a determination that the subject recognition unit has recognized a plurality of subjects including the subject.

8. The imaging device according to claim 6, wherein the focus control unit is further configured to execute tracking focus control for the subject based on the target focus position set after an end of the movement of the focus position.

9. The imaging device according to claim 6, further comprising:
a display control unit configured to:
- superimpose and display a first frame image on a specific subject of a plurality of subjects focused by the focus control unit, the plurality of subjects is recognized by the subject recognition unit; and
- superimpose and display second frame image on remaining subjects of the plurality of subjects.

10. The imaging device according to claim 5, wherein the focus control unit is further configured to:
- set, as a first control, a focus position closest to the end time focus position among focus positions corresponding to the in-screen target position as the target focus position,
- set, as a second control, the target focus position based on the focus position and the moving direction at an end time point of the movement, and
- switch from the first control to the second control based on a determination that where a deviation between the closest focus position and the end time focus position is equal to or more than a specific threshold.

11. The imaging device according to claim 2, wherein
the user operation detection unit is further configured to determine an operation of the user on a focus ring; and
the focus position movement detection unit is further configured to determine the moving direction of the focus position based on an operation direction of the focus ring.

12. The imaging device according to claim 11, wherein the focus control unit is further configured to:
- switch between a first mode in which autofocus control on a subject is executed and a second mode in which manual focus control is executed, and
- switch to the second mode based on a determination of an operation on the focus ring in the first mode, wherein the determination is by the user operation detection unit.

13. The imaging device according to claim 11, wherein the user operation detection unit is further configured to determine that an end of the movement of the focus position is determined based on a determination that a first state in which an operation on the focus ring is determined as the operation of the user is changed to a second state in which the operation is not determined.

14. The imaging device according to claim 2, wherein the user operation detection unit is further configured to determine a focus operation of the user based on reception of operation information transmitted from an external operation device; and
the focus position movement detection unit is further configured to determine the moving direction of the focus position based on an operation direction of the focus operation.

15. The imaging device according to claim 1, further comprising
an area setting unit configured to set the focus control target area based on an operation of a user.

16. The imaging device according to claim 1, wherein the focus control unit is further configured to execute focus control based on a set focus moving speed.

17. A focus position setting method, comprising:
determining an operation of a user for focus control;
determining movement of a focus position based on the determined operation of the user;
determining depth information in a focus control target area;
setting each of a plurality of in-screen target positions based on the depth information;
setting a target focus position based on the movement of the focus position, the determined depth information, and an end time focus position at a time of determination that an operation of the user with respect to the movement of the focus position has ended; and setting, based on a determination that the plurality of in-screen target positions is set, a focus position closest to the end time focus position among focus positions corresponding to the plurality of in-screen target positions as the target focus position.

18. A non-transitory computer-readable medium having stored thereon, computer-executable instructions which, when executed by a computer, cause the computer to execute operations, the operations comprising:

determining an operation of a user for focus control;

determining movement of a focus position based on the determined operation of the user;

determining depth information in a focus control target area;

setting each of a plurality of in-screen target positions based on the depth information;

setting a target focus position based on the movement of the focus position, the determined depth information, and an end time focus position at a time of determination that an operation of the user with respect to the movement of the focus position has ended; and setting, based on a determination that the plurality of in-screen target positions is set, a focus position closest to the end time focus position among focus positions corresponding to the plurality of in-screen target positions as the target focus position.

* * * * *